US007718883B2

(12) United States Patent
Cookerly

(10) Patent No.: US 7,718,883 B2
(45) Date of Patent: May 18, 2010

(54) COMPLETE ORCHESTRATION SYSTEM

(76) Inventor: Jack Cookerly, 18160 Cottonwood Rd., #737, Sunriver, OR (US) 97707

(*) Notice: Subject to any disclaimer, the term of this patent is extended or adjusted under 35 U.S.C. 154(b) by 405 days.

(21) Appl. No.: 11/794,701

(22) PCT Filed: Jan. 18, 2006

(86) PCT No.: PCT/US2006/001566

§ 371 (c)(1), (2), (4) Date: Jul. 3, 2007

(87) PCT Pub. No.: WO2006/078635

PCT Pub. Date: Jul. 27, 2006

(65) Prior Publication Data

US 2009/0193960 A1 Aug. 6, 2009

Related U.S. Application Data

(60) Provisional application No. 60/645,184, filed on Jan. 18, 2005.

(51) Int. Cl.
*A63H 5/00* (2006.01)
*G04B 13/00* (2006.01)
*G10H 7/00* (2006.01)
*H02M 5/00* (2006.01)

(52) U.S. Cl. .......................................... 84/609; 84/619

(58) Field of Classification Search .................. 84/609, 84/619, 634
See application file for complete search history.

(56) References Cited

U.S. PATENT DOCUMENTS

| | | | | |
|---|---|---|---|---|
| 5,736,666 | A * | 4/1998 | Goodman et al. | 84/669 |
| 5,773,744 | A * | 6/1998 | Nagata | 84/610 |
| 5,876,213 | A * | 3/1999 | Matsumoto | 434/307 A |
| 6,369,311 | B1 * | 4/2002 | Iwamoto | 84/615 |
| 6,506,969 | B1 * | 1/2003 | Baron | 84/609 |
| 6,657,114 | B2 * | 12/2003 | Iwamoto | 84/610 |
| 2003/0100965 | A1 * | 5/2003 | Sitrick et al. | 700/83 |

* cited by examiner

*Primary Examiner*—Jeffrey Donels
(74) *Attorney, Agent, or Firm*—Berliner & Associates

(57) ABSTRACT

The present invention provides a complete orchestration system to generate melodic lines of any length in real time to provide a new musical accompaniment with no repeated phrases each time a particular style is played, and which can generate accompaniment styles played by groups of any size up to full symphony orchestras. It instructs a computer processing unit to compose and orchestrate a particular style of music by merely describing, to the orchestration system, the attributes of that style. An original musical score can be generated and performed that can be synchronized to the scenes in a video production to provide a complete orchestration video system.

20 Claims, 35 Drawing Sheets

Darn That Dream

FIG. 2B
11
2: Vlns 1
3: Vlns 11
4: Vlas
14
2: Vlns 1
3: Vlns 11
4: Vlas
17
2: Vlns 1
3: Vlns 11
4: Vlas

FIG. 2C
20
2: Vlns 1
3: Vlns 11
4: Vlas
23
2: Vlns 1
3: Vlns 11
4: Vlas
26
2: Vlns 1
3: Vlns 11
4: Vlas

FIG. 3A
Over The Rainbow
jack cookerly
Copyright © 2000 by jack cookerly
2: VLNS I (20)
3: VLNS II
4: VLNS III
5: VLNS IV
7: TREM VLNS (01)
9: CELLI (21)
12: BSS (022)
23: RHODES (12)
25: OBOE (014)

*FIG. 3B*
5
2
VLNI
VLNI
VLNI
VLNI
VLNI
CELI
(21)
BSS
RHO
25:
OBO

FIG. 3C
2:
VLN
VLN
4:
VLN
5:
VLN
IV
9:
CELI
(21)
12:
BSS
23:
RHO
(12)
25:
OBO

FIG. 3D
12
2: VLNI
3: VLNI
4: VLNI
5: VLNI
IV
12: BSS
25: OBO

*FIG. 4A*
1: Solo
Trumpet
Trumpet
UNIS
15: Tuba
20: Clars
4-7

76 trombones

FIG. 4E
38
1: Solo Trum
4: UNIS
5: Trom Port
20: Clars 4-7
22: Picc MIR

Back Home Again In Indiana

FIG. 5D
22
3: Clar C32
8: Trb C12
11: TRP1 MEL/
14: guitar 8
16: Fende
25
3: Clar C32
8: Trb C12
11: TRP1 MEL/
14: guitar 8
16: Fende

COMPLETE ORCHESTRATION SYSTEM

PRIORITY

This application is a National Stage of International Application No. PCT/US06/01566, filed Jan. 18, 2006, which is a continuation of U.S. Provisional Application No. 60/645,184, Jan. 18, 2005.

BACKGROUND

1. Field of Invention

The field of art to which this invention pertains is electronic musical instrumentation. In particular, the present invention pertains to instruments that incorporate automatic orchestration control.

2. Related Art

Electronic music synthesizer devices have been introduced for playing musical tunes and musical accompaniment by transforming digitized data, which is representative of the tune or accompaniment to be played, into corresponding sounds. Essentially, the tunes are first digitized through one of a variety of methods and then played back upon command by the synthesizer device. The playback may be immediate, so that a user can operate, e.g., an electronic keyboard to produce music electronically. Some synthesizer systems permit the user to establish an orchestration for a tune, for example in U.S. Pat. Nos. 4,433,601, 4,508,002, 4,519,286, 4,542,675, 4,630,517, 4,682,526, and 4,719,834, in which the present inventor is a co-inventor. It is often the case that the selected orchestration is imposed on the entire tune. There is a need for an orchestration system that allows the user to automatically compose and orchestrate "on the fly" for anything from a small group to a large symphony orchestra, that is non-repeating (unless you ask it to repeat), and which also has applications for automatically scoring home video productions.

SUMMARY

The present invention satisfies the foregoing need. It provides a complete composition/orchestration system to generate melodic lines of any length in real time to provide a new musical accompaniment with no repeated phrases each time a particular style is played, and which can generate accompaniment styles played by groups of any size up to full symphony orchestras.

More particularly, the invention instructs a computer processing unit to compose and orchestrate a particular style of music by merely describing, to the orchestration system, the attributes of that style. There are basically two categories addressed by the orchestration system: (a) composing and orchestrating the basic main melodic lines and the musical accompaniment for those melodic lines; and (b) composing and orchestrating only the musical accompaniment to a melodic line (melody) provided from an external source.

A significant implementation of the latter category is generating and performing an original musical score that can be synchronized to the scenes in a video production to provide a complete orchestration video system. This can be done with either professional productions or with home videos. All that is needed is to input the picture timings for selected scenes and the type of music for each selected scene, selected from a comprehensive list of various types of music.

DETAILED DESCRIPTION OF THE INVENTION

Abbreviations and Definitions

Figure 1:
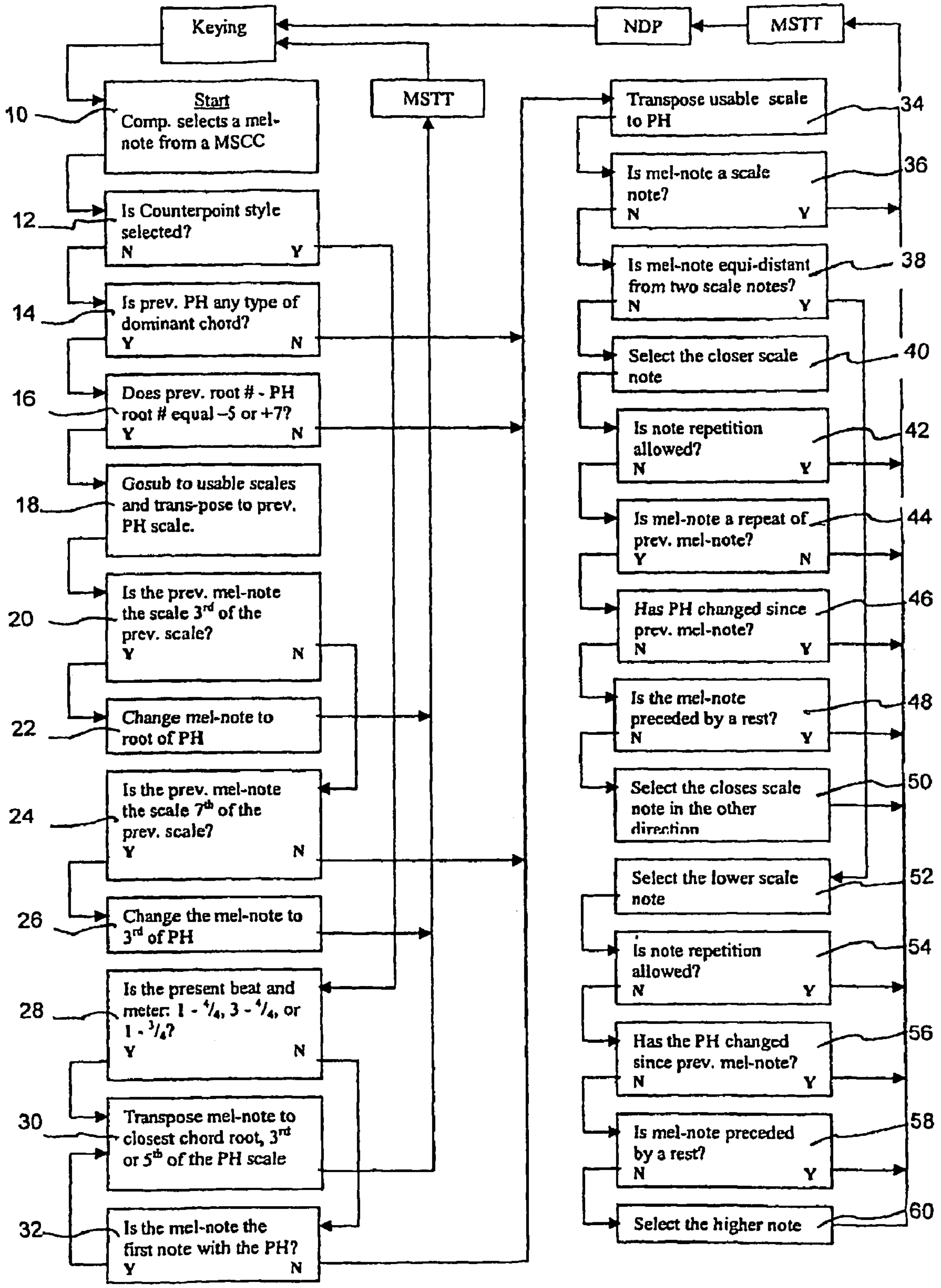
FIG. 1 is a flow chart of the orchestration system of this invention.

The following abbreviations and definitions are used in various parts of the specification:

"Computer Processing unit" means any computing device including computers, central processing units, computer-on-a-chip, or any electronic device capable of making computations and/or allowing selection from a list, including without limitation, any hard-wired device that performs the functions required of the present invention.

"Orchestration" is the art of employing, in an instrumental composition, various instruments in accordance with their individual properties along with the composer's concept of the sonorous effect of the work. Orchestration requires a detailed knowledge of the playing mechanism, playing capabilities which includes knowing the fingering problems, the usable and useful musical range and the tone quality of every instrument as it changes within the limits of its range.

Given a composition comprised of several melodic lines including counter melodies, sustained harmonies and musically rhythmical lines, a competent orchestrator can orchestrate several versions of the composition which are completely different from each other. It can be seen from this that the orchestration is as important in achieving a desired emotional effect as any of the other musical ingredients and in some instances more important.

It is assumed that the orchestration system can satisfactorily produce the sound of all the orchestral instruments along with most keyboard and percussion instruments. Since orchestration is so effective in describing a "mood", various types of orchestration are included in the category along with melodic and melodic rhythmic aspects which will musically describe a scene.

"COS" is the complete orchestration system of this invention, which generates melodic lines of any length in real time to provide a new musical accompaniment with no repeated phrases each time a particular style is played, and which can generate accompaniment styles played by groups of any size up to full symphony orchestras.

"COVS" is a form of COS, a complete orchestration video system, which generates and performs an original musical score, using COS, that can be synchronized to the scenes in a video production "MSCC" refers to melodic sequence contour control in which melody notes are selected one at a time from a note sequence having the following parameters selected by the computer processing unit:

the number of notes before repeating, the musical interval encompassed by the sequence, the starting pitch of the highest note that defines the octaves (the musical register) in which the melody notes will sound, and approved duration parameters.

"Range" is the musical range of the melody notes from highest to lowest, and can be defined by:

the number of semitones (chromatic steps) between the highest and lowest note such as 5, 7, 9, 14 etc, musical intervals such as: perfect fourth (5 semitones), perfect fifth (7 semitones), seventh (9 semitones), ninth (14 semitones), the names of the lowest and highest melody notes along, with the octave in which they sound such as C4 to G5, or the midi numbers of the notes—48 (C4) to 67 G5)

"Melodic contour" (also referred to as the melodic structure) is the "up and down-ness" of the pitch as the melody proceeds. Starting with a particular pitch within the range, one or more intervals are added to or subtracted from successive pitches (notes) to cause a melody to ascend or descend in pitch creating a "melodic" contour". Various algorithms control the melody contour if the addition or subtraction of a particular interval value would force the melody out of the intended range.

The melodic contour of every melodic phrase or rhythmic musical phrase is controlled by the MSCC, which also controls the register (octave or octaves in which the melody sounds) and the musical ranges covered for all melodic figures sounding.

"MSTT" refers to melodic sequence timing template selected by the computer processing unit and determines:

the exact points in time relative to the musical beat when the melody notes from the MSCC will be keyed, the duration of the melody note, and the velocity (volume) with which the note will sound.

The density of melodic notes is represented by the total number of note timings in a MSTT having a length of two measures. The density can vary from 1 or 2 in some melodic music to greater than 60 in very active cartoon music MSTTs are generally two measures. in length and are specifically designed for various types (scoring styles) of music which will properly describe various types of visual scenes such as romance, action, cartoon, comedy, scenic, mystery, suspense, children, light activity, industrial, documentary, ethnic, jazz, big band, counterpoint, country, popular music forms, and the like. Table 1 contains a list of scoring styles used in this invention. Most styles can have short "play ons", "play offs"

TABLE I

| Scoring Styles (Composition Styles) | |
|---|---|
| Cartoon | |
| | cuey |
| | mysterioso |
| | chase |
| | action |
| | comedy suspense |
| Dramatic | |
| | action |
| | chase |
| | mysterioso |
| | light tension |
| | heavy tension |
| | melodic |
| | romantic |
| Children | |
| | babies |
| | small children |
| | cute antics |
| | children running |
| Industrial | |
| | light mechanical |
| | heavy mechanical |
| Scenic | |
| | very light scenic |
| | light melodic |
| | medium heavy scenic |
| | heavy melodic |
| | seascape |
| | slightly mysterious descending |
| | light-no movement |
| | dark melodic - no motion |
| | light "watery" sounding |
| | full melodic scenic |
| | light-lonesome feeling |
| | light descending feeling |
| | light neutral activity |
| Jazz | |
| | easy listening |
| | small group |
| | big band |
| | single instrument |
| Documentary | |
| | nationality (country) |
| | importance (event) |
| Flash-back special effect | |
| Activity | |
| | light activity |
| | "busy busy" |
| Country | |
| | CW |
| | CW ballad |
| | Bluegrass |
| | Texas swing |
| Classical | |
| | Bach (counterpoint) |
| | Handel |
| | Haydn |
| | Tschaikovsky |
| | Debussy |
| | Ravel |
| | Mozart |
| Strauss Waltz | |
| Ethnic | |
| | Mexican 3/4 and 4/4 |
| | Tex Mex 3/4 and 4/4 |
| | Mariachi 3/4 and 4/4 |
| | Argentina |
| | Polka |
| | Germany |
| | Italy |
| | Japan |
| | Greece |
| | France |
| | Scotland |
| | Ireland |
| | Russia |
| | Jamaica (steel drums & Reggae) |
| Funk | |
| Hawaiian | |
| Classical guitar | |
| Dixieland | |
| Marching band | |
| Sports march | |
| Outer space | |
| Short popular motifs | |
| | like "Twilight Zone" |
| | like "Dragnet" |
| Stings | |
| | dramatic |
| | comedic |
| Boogie Woogie | |
| | several two styles |
| Religious | |
| | Gospel |
| | melodic scoring |
| | (orchestra and organ) |

TABLE I-continued

| Scoring Styles (Composition Styles) |
|---|
| Specific PD melodies (via midi files) |
| both wedding marches on organ |
| "Happy Birthday:" |
| "Taps" |
| "Reville" |
| Rock categories |
| A to Z |
| Rap drum tracks only |

"NDP" refers to the note duration parameters and determines if the proposed duration of the melody note, as indicated by the MSTT, is acceptable in view of its harmonic function. The melody note may be corrected to another note at this point. The note timings are accessed by the NDP before keying so melody note durations can be evaluated after the harmonic evaluation. The parameters are shown in Table II below.

| | |
|---|---|
| Main melody | Woodwind section. |
| Counter melody 1 | Each solo wind instrument |
| Counter melody 2 | Piano |
| Short fill-in phrases | Electric keyboard |
| Sustained harmonies (chords) | Celeste |
| Bass (sustained or rhythm) | Orchestra bells |
| String section | Harp |
| Brass section | Rhythm guitar |

Every note of every musical phrase that sounds in a musical composition generated by the COS or COVS is controlled by a MSTT designed for that particular type of musical phrase.

The register in which a melody sounds can be high, medium or low because of the octave, octaves and/or partial octaves in which the melody notes sound.

The rhythmic template determines when, relative to a particular beat, each note is sounded, the length of time the note is sustained and other characteristics such as the volume level.

TABLE II

| NOTE DURATION PARAMETERS |
|---|
| Major; transpose the selected note to the closest root, $3^{rd}$ or 5th of the chord if it is the: |
| $2^{nd}$ of the scale having a duration >180 tics (qtr + 8th) |
| $7^{th}$ of the scale having a duration >240 tics (½) |
| $4^{th}$ of the scale having a duration >60 tics ($8^{th}$) |
| Minor; transpose the selected note to the closest root, $3^{rd}$ or 5th of the chord if it is the: |
| $4^{th}$ of the natural minor scale having a duration >180 tics (qtr + $8^{th}$ ) |
| $4^{th}$ of the minor $b5^{th}$ scale having a duration >120 tics (¼) |
| $2^{nd}$ of the minor scale having a duration >120 tics (½) |
| Dominant $7^{th}$: transpose the selected note to the closest root, $3^{rd}$ or 5th of the chord if it is the: |
| $6^{th}$ of the scale having a duration >180 tics (qtr + $8^{th}$) |
| $4^{th}$ of the scale having a duration >60 tics ($8^{th}$) |
| $3^{rd}$ of the scale having a duration >240 tics (half) |
| $2^{nd}$ of the scale having a duration >240 tics (half) |
| Dominant $7^{th}$ + 5: transpose the note to the root of the chord if it is the |
| $3^{rd}$ of the scale having a duration >240 tics (half) |
| $2^{nd}$ of the scale having a duration >240 tics (half) |
| Dominant $7^{th}$b9: : transpose the note to the b9 of the chord if it is the |
| $3^{rd}$ of the scale having a duration >240 tics (half) |
| Dominant $7^{th}$#9 transpose the note to the root of the chord if it is the |
| $3^{rd}$ having a duration >240 tics (half) |
| Diminished: transpose the selected note to the closest chord note if it is the: |
| $2^{nd}$, $4^{th}$ , $6^{th.}$, $8^{th}$ of the diminished scale having a duration >120 tics (qtr) |
| Augmented; transpose the selected note to the root, $3^{rd}$ or $5^{th}$ of the chord if it is the: |
| $2^{nd}$, $4^{th}$, $6^{th.}$ of the augmented scale having a duration >120 tics (qtr) |

When the type of descriptive music is chosen, the tempo, melodic structure, and density of the melodic notes, for a particular type, are determined by the COS or COVS and are integrated into the composition made by the COS or COVS. These attributes are necessarily very closely related and mutually dependent.

A compound MSTT has coordinated timing information for two or three simultaneously sounding melodic lines, and can provide a three or four part contrapuntal composition, a big band composition having a sax section, trumpet section and trombone section or a large orchestra having many instrumental sections. By utilizing many instrumental sections simultaneously, each using different MSCCs and MSTTs, it is possible to emulate any style of music and musical groups of any size up to and including symphonic size using as many as 17 MSTTs.

A typical orchestral composition generated by the COs or COVS would contain a separate MSTT controlling the notes in a separate MSCC for each of the following functions:

Rhythmic templates for any style of music can be specified and selected on a random basis by the COS or COVS "Harmony" is defined as a particular chord root (the root is the note for which the chord is named such as: "C", "G" etc.) and a particular chord type such as "major", "seventh", and the like, at any point in time.

There is a particular scale for every chord type such as major, minor, seventh ($7^{th}$) diminished, augmented, $6^{th}$, $9^{th}$, $11^{th}$, $7^{th}$−5, $7^{th}$+5, $7^{th}$−9, $7^{th}$+9 etc. and chords are given same name as the scale ($6^{th}$, $9^{th}$, $11^{th}$, $7^{th}$−5, $7^{th}$+5, $7^{th}$−9, $7^{th}$+9 etc) when they are comprised of particular notes from these scales. Since a sequence of harmonic changes (chord changes) is generally associated with a melody, the pitch of the selected melody note can be transposed, if necessary to a scale note of the present harmony To harmonize is to add one or more chord notes to a melody note.

"HS" refers to a harmonic sequence, which is a sequence of harmonies comprised of particular roots with particular chord types. The harmonic variance in composing music suitable for films is not as varied as other compositional elements such as tempo, melodic contour, melodic rhythmic aspects and orchestration although certain harmonic sequences can be utilized to describe certain types of scenes.

"PH" refers to the present harmony and is the particular harmony in effect at the point in time melody notes or accompaniment notes are sounded.

"HSTT" refers to harmonic sequence timing templates. These templates are similar to the Melodic Sequence Timing Templates in that they indicate when harmonies change. With the COVS, dependent on the type of scene, a chosen harmony can remain in effect for 2, 3 or 4 beats or for several measures. The COVS choose the HSTTs based on the category of the music. Particular Harmonic Sequences (HS), Harmony Sequence Timing Templates (HSTTs), Melodic Sequence Contour Controls (MSCCs) and Melodic Sequence Timing Templates (MSTTs) are assigned to be used with particular categories describing certain scenes.

The COS or COVS selects the type of harmonic sequence according to the category describing the scene. The harmonies are selected sequentially starting with the first harmony. This is because the sequence is following a musically accepted and sensible order of harmonies and not just choosing harmonies at random. The list is treated as a loop. Each time, upon returning to the beginning of the loop.

"HSNS" refers to harmony sensitive note series is designed in a manner that allows the COS or COVS to closely emulate the melodic style of a particular musician playing a particular instrument. In order to provide all the different melodic contours needed, 25 to 45 consecutively numbered notes are needed. The notes are keyed (caused to sound) by special MSTTs which contain all the "phrasing" characteristics of the player being emulated.

The attributes that define any player playing any instrument are the phrasing, the choice of notes, the volume of each note, the duration of each note and the contour of each phrase. The HSNS provides the contour and the special MSTTs provide the remainder. A significant difference between these harmony sensitive series and prior orchestration systems is that the notes in the series are not always sounded sequentially and no melodic phrase will ever be repeated The following parameters are carefully observed:

- the usable practical and playable musical range for the particular instrument is closely observed,
- all resulting melodic figures can actually be played by a professional player playing a particular instrument, and
- the resulting melodic contours are typical of the particular player being emulated.

The HSNS is constructed by having each sequence of notes sensitive to a single chord type and four different roots. A note sequence can be sensitive to a major chord type and a. Bb root. Notes in the Bb sequence can be transposed to also conform to the roots of B, C Db with the chord type remaining major. The same transpositional relationship exists with the four roots of D, Eb, E, F and the four roots of Gb, G, Ab and A. A Four other chord types minor, seventh, diminished and augmented are represented in this manner. When other chord types such as a $7^{th}$ with a b9, or a $7^{th}$ with b5 are indicated, transposition of particular notes in the normal $7^{th}$ chord are made as the note is sounded. Each instrument requires a special HSNS because of playability and range issues.

Most other orchestration systems transpose figures written with a C root to all the remaining chromatic roots. This causes all instruments to play out of the normal range either too high or too low creating abnormal musical sounds and creates musical figures that are unplayable in real life as well as using constantly repeated phrases.

Using a different series, the notes for all chord types in a C root, E root and Ab series are as close as possible in pitch to each other. For this reason, and also because the notes are numbered sequentially, it is possible that note #23, for example, with a F root) will be lower in pitch than note #23 with a C root even though the F root is five semitones higher than the C root. This practice totally eliminates awkward and unrealistic melodic skips.

To select and sound the series notes, they are represented as consecutively numbered eighth notes which manifests as 8 notes per measure in 4/4 meter and 6 notes per measure in ¾ meter.

"NSTT" refers to note sequence timing templates. Separate and special NSTTs are created for each "emulation" process needed because of range and playability issues. Since the duration of the notes is determined by an NSTT, the notes can be of any length. In either meter, ¾ or 4/4 and the like, only odd numbered notes will sound on the beat and even numbered notes will sound on the $2^{nd}$ half of the beat. (the "&" count). In the case of a triplet (three notes in one beat) the first note is odd numbered, the second note is the next even number and the third note is the next odd. If the next note is on the beat, the next odd note in the series is next, and so on.

NSTTs are selected according to the varying range desired for a particular performance. The series notes are selected according to the NSTTs.

A counter melody is any melody played at the same time as the main melody. There is no limit to the number of counter melodies the COS or COVS can generate at one time. A counter melody may sound as a single note or be harmonized as in a string, woodwind or brass section. All counter melodic lines are generated by the COS or COVS. Any melodic line, single note or harmonized, heard in addition to the melody of the song being played is a generated counter melody.

"Chord voicing" refers to the spacing and harmonic function of each harmony note added below the melody note relative to a particular chord root and chord type. Professional orchestrators voice chords differently for each instrumental section such as strings, woodwinds, brass and vocal group as well as for various combinations of instruments. All COS or COVS chord voicings are musically correct. Critical note doublings are strictly observed relative to the function of the chord. The COS or COVS can provide thousands of musically correct chord voicings.

Implementations

How the COS Composes in a Particular Style

A series of intervals, described above under MSCC, and rhythmic templates, described above under MSTT, are selected on a random basis from lists designed expressly for particular musical categories such as: cartoon, comedy, children, any popular style, Latin, jazz, fast moving action, ethnic, scenic, and the like, such as shown in Table I.

Before a melody note is allowed to sound, the harmonic function of the melody note is evaluated with respect to the present harmony as related to the preceding harmony. If the present harmony differs from the preceding harmony and the melody note being evaluated is the first note to sound with the present harmony, a proper harmonic resolution may be demanded by the previous melody note dependent on the relationship of the previous harmony to the present harmony. If a resolution is demanded, the melody note will be transposed to the pitch demanded by the resolution.

A melody note, which is one of the notes comprising a particular chord type, may also create a slight melodic tension because of its active function in the scale of the chord type and the length of time the rhythm template indicates it is to be sustained. This can set up a undesirable unresolved melodic tension which is alleviated by transposing the melody note to another scale note.

A melody note, even if it is a note from the scale from which the chord is derived, can, because of its harmonic function in the scale in the scale, also set up an undesirable unresolved melodic tension because of the length of time the rhythm template indicates it is to be sustained. This, again, is alleviated by transposing the melody note to another scale note. Transposition to another melody note in this case could result in a repeat of the same phenomena in which case the melody note would be transposed again.

To create an almost exact performance of a particular melodic style of a single instrument or an orchestral section, a list of specific notes (pitches) which are related to specific chord roots can be specified. The notes in the list are numbered sequentially so that the odd numbered notes are sounded on the beat and the even numbered notes are sounded on the second half of the beat with no restriction to the length of time the notes are sustained. Special algorithms allow the use of three notes (triplets) or four notes per beat while maintaining the integrity of the list.

The COS can constantly monitor the density of melodic notes played by the player. When that density reaches a prescribed level, the COS can provide less dense accompaniment figures which will not interfere with the player or more dense accompaniment figures when the player is playing a very sparse melody. The COS will evaluate the density of each rhythmical template and eliminate certain time points while maintaining the original rhythmical intent.

How the COVS Composes in a Particular Style

The basic musical elements from which the COVS selects the material to compose are supplied by professional composers who have expertise in orchestration and have had great experience in scoring films. They must also be able to describe, in words, all the elements contained in a composition which will musically describe and support a very narrow area in a particular category such as those listed in COVS Scoring Styles. The basic elements which have to be supplied to the COVS relative to a particular category are the following:

The meter

The tempo

The type of melody or melodies

The type of harmonic sequences

The density of all moving musical figures

The orchestration—this determines which instruments play which melodic lines and figures The composer/orchestrator does not write any notes but, instead, specifies the critical parameters for elements listed above which will produce the desired musical results for each type of composition. The elements specified by the composer/orchestrator are relative to the number of measures any particular element is functioning.

These composition specifications are assigned only to the category for which they were designed. There can be more than one set of specifications for each category. These specifications can differ greatly in style and content, yet each set of specifications can create a composition which has the same desired musical effect in supporting the video. The same situation exists in the film business when 5 different composers can write 5 different scores for a film and all five scores have the proper effect in supporting the film.

Since more than one set of specifications is available for each category, the COVS can select the set of specifications which will be used to compose an appropriate musical cue.

The permutations are enormous considering that:

MSCCs number in the hundreds (which can start on any of 10 to 28 notes),

MSTTs numbering in the hundreds (which controls when, relative to the beat, the notes wick be sounded), HSs number in the hundreds, HSTTs number in the hundreds (which control when the harmonies will be employed), and tempo variations are within an approximate range of 10 BPM Accordingly, the probability of a composition ever being repeated is virtually non-existent.

FIG. 1 is a flow chart of the composition/orchestration system of this invention. For ease of reading, the phrase "mel-note" is used as an abbreviation for "melody note". Reference is made to usable scale notes. These are found in Table III below.

TABLE III

| Usable scale notes for melodic lines according to chord type (ex. scale notes: C, D, E, G, A, B ex: scale structure: 0, 2, 2, 3, 2, 2) |
|---|
| MAJOR |
| C major (6, M7, M9, 6add9) C, D, E, F, G, A, B 1, 2, 3, 5, 6, 7 0, 2, 2, 3, 2, 2 |
| C major (sus4) C, D, F, G, A, B 0, 2, 3, 2, 2, 2 add F to major chord and account for it in transposition |
| MINOR |
| C minor (Cm add4, Cm add9) C, D, Eb, F, G |
| C minor $6^{th}$ (Cm6 add9) C, D, Eb, F, G, A, 1, 2, 3, 4, 5, 6 0, 2, 1, 2, 2, 2, 2 |
| C minor seventh (Cm7, Cm9, Cm11, Cm7add4, CmM7, Cm7b5) C, D, Eb, F, G, Bb) 1, 2, 3, 4, 5, 7 0, 2, 2, 1, 2, 3 |
| C minor seventh (b5) C, D, Eb, F, Gb, Bb 1, 2, 3, 4, 5, 6, 7 0, 2, 1, 2, 1, 4 |
| C minor seventh (maj7) C, D, Eb, F, G, A, B 1, 2, 3, 4, 5, 6, 7 0, 2, 1, 2, 2, 2, 2 |
| DOMINANT SEVENTH |
| C dominant seventh (C7, C9, C7 add6, C9 add6 = $C13^{th}$) C, D, E, G, A, Bb 1, 2, 3, 5, 6, 7 0, 2, 2, 3, 2, 1 |
| C dominant seventh (sus4) C, D, E, F, G, A, Bb 1, 2, 4, 5, 6, 7 0, 2, 3, 2, 2, 1 |
| C dominant seventh (#5) C, D, E, G#, Bb 1, 2, 3, 5, 7 0, 2, 2, 4, 2 |
| C dominant seventh (b9) C, Db, E, F, G, A, Bb 1, 2, 3, 5, 6, 7 0, 1, 3, 3, 2, 1) |
| C dominant seventh (#5, b9) C, Db, E, G#, Bb 1, 2, 3, 5, 7 0, 1, 3, 4, 2 |
| C dominant seventh (b9, add6) C, Db, E, G, A, Bb 1, 2, 3, 5, 6, 7 0, 1 0, 1, 3, 3, 2, 1 |
| C complex dominant seventh C, Db, Eb, E, F#, G, A, Bb 1, 2, 3, 4, 5, 6, 7, 8 0, 1, 2, 1, 2, 1, 2, 1 |
| DIMINISHED |
| C diminished (add9, maj7) C, D, Eb, F, F#, G#, A, B 1, 2, 3, 4, 5, 6, 7, 8 0, 2, 1, 2, 1, 2, 1, 2 |
| AUGMENTED |
| C augmented C, E, G# 1, 3, 5 0, 4, 4 |

Starting at 10, a composition style is selected as input. Having been given input parameters for the music to be composed, the computer processing unit selects from a list of over 100 MSCCs. The system then determines, at 12, if counterpoint style was enabled by being selected (e.g., from an external description). If counterpoint was enabled (Y) the composition will be in a contrapuntal style (N) If counterpoint is not enabled, (N) proceed to the next box, at 14. (Y) If counterpoint is enabled (Y), go to box 28 which determines which beat of the measure is current At box 14, the system determines whether the previous PH is any type of dominant chord. The PH is the harmony in effect when a melody is sounded. Dominant chords are basically major chords to which the flatted $7^{th}$ note of the major scale has been added. This type of $7^{th}$ makes the chord "active" and it wants to resolve to a "passive" chord, usually a major chord and can be labeled "dominant" over the next chord even if the next chord is not major. The two most active notes in the dominant $7^{th}$ are the $7^{th}$ and the $3^{rd}$. If Y, go to box 16 to determine if this particular dominant will affect the PH. If N, go to box 34 to evaluate other scale notes At box 16, the system determines if the previous PH root number minus the PH root number equal −5 or +7. The root is the note for which the chord is named (Eb, G etc) The numbers used in this process are "MIDI" numbers. MIDI is Musical Instrument Digital Interface. Midi notes are numbered consecutively from C 0 (#1) which is four octaves below middle C (60) Subtracting the root midi numbers indicates whether or not the previous PH root was at the interval of a $4^{th}$ below or a $5^{th}$ above the present root. This indicates the position in the musical "circle of fifths" of the previous PH to the PH. Roots tend to resolve to another root a $4^{th}$ below or a $5^{th}$ above. If Y, go to box 18. If N, go to box 34 to evaluate other scale notes At box 18, the system gosubs to usable scales and transposes to the previous PH scale. This is to determine if the previous melody note could be one of the two active notes in the PH as explained above with respect to box 14.

At box 20, the system determines if the previous melody is the scale $3^{rd}$. If Y, we know the previous melody note, the $3^{rd}$, wants to resolve to the root of the present chord so go to box 22 and change the melody note to the root If N, go to box 24 to determine if the melody note is the other active dominant chord note, the $7^{th}$.

At box 22, the system changes the melody note to the root of the PH" This properly satisfies the demanded resolution. At this point, the melody note is ready to be keyed according to the MSTT.

At box 24, the system determines if the previous melody note the scale $7^{th}$ of the previous scale. If Y, go to box 26 which changes the melody to the proper resolution, the $3^{rd}$. If N, go to box 34 to evaluate other scale notes.

At box 26, the system changes the melody note to the $3^{rd}$ of the PH scale. At this point, the melody note is ready to be keyed according to the MSTT, and satisfies the demanded resolution At box 28, the system determines if the present beat is any one of the following beats in the meter shown in box 28, i.e., beat 1-4/4 meter, beat 3-4/4 meter, beat 1-¾ meter. Counterpoint is enabled at this point and the exact beat of the measure is determined. If Y, go to box 30 for additional transposition. If N, go to box 34 to evaluate other scale notes.

At box 30, the melody notes falling on beat 1 in 4/4 meter, beat 3 in 4/4 meter and beat 1 in ¾ meter are transposed to the closest root, $3^{rd}$ or $5^{th}$ of the PH scale and are sent to the MSTT for keying.

At box 32, the system determines if the melody note is the first note with the PH. If Y, go to box 30 for possible transposition. If N, go to box 34 to evaluate other scale notes.

At box 34, the system transposes the usable scale to PH. This transposition makes it possible to analyze other types of melody notes and goes to box 36.

At box 36, the system determines if the melody note is a scale note. If Y, go to MSTT, then NDP, then keying. If N, go to box 38.

At box 38, the system determines if the melody note is equidistant from two scale notes. If Y, go to MSTT then NDP, then keying. If N, go to box 52

At box 40, the system selects the closer scale note, then goes to box 42.

At box 42, the system determines if note repetition is allowed. If Y, go to MSTT, then NDP, then keying. If N, go to box 44 to test for a repeat At box 44, the system determines if the melody note is a repeat of previous melody note. If Y, go to box 46. If N, go to MSTT, then NDP, then keying.

At box 46, the system determines if the PH has changed since the previous melody note. If Y, go to MSTT, then NDP, then keying. If N, go to box 48.

At box 48, the system determines if the melody note is preceded by a rest. If Y, go to MSTT, then NDP, then keying. If N, go to box 50.

At box 50, the system selects the closest scale note in the other direction, go to MSTT, then NDP, then keying.

At box 52, the system selects the lower scale note, and goes to box 54.

At box 54, "the system determines if note repetition is allowed. If Y, go to MSTT, then NDP, then keying. If N, go to box 56.

At box 56, the system determines if the PH has changed since the previous melody note. If Y, go to MSTT, then NDP, then keying. If N, go to box 58.

At box 58, the system determines if the melody note is preceded by a rest. If Y, go to MSTT, then NDP, then keying. If N, go to box 60.

At box 60, the system selects the other (higher) scale note and goes MSTT, then NDP, then keying.

Note selection status at keying points. If the melody note at box 36 is a scale note, the keying is accomplished by going to MSTT, then NDP, then keying. The note at box 38 is not a scale note and is not equidistant from two scale notes. If the melody note at box 38 is not a scale note and is not equidistant from two scale notes, keying is accomplished in one of the following steps: Box 42, 44, 46, 48, 50.

The note at box 52 is not a scale note and is equidistant from two scale notes. If the melody note at box 52 is not a scale note and is equidistant from two scale notes, keying is accomplished in one of the following: Box 54, 56, 58, 60.

The following examples illustrate the invention.

COS

On every selection which has a played melody, the melody is always played with just one finger. The melody may sound as a single note, two notes in octaves, several notes in unison or harmonized with chord notes, but still just one finger plays the melody in every selection. One, two or three notes are played by the left hand and identify the chord root and chord type. As usual, those notes are not sounded. The COS can generate any type of introduction and ending which can be of any length and different every time. The COS can also generate different harmony sequences each time for introductions and endings rather than repeating the same harmony sequences as is standard today.

EXAMPLE 1

"Darn That Dream"

Figure 2A:
FIGS. 2 A-C are pages of musical notation for orchestration selected by the orchestration system of this invention for the melody line for "Darn That Dream"
Figure 2B:
Figure 2C:
Figure 3A:
FIGS. 3 A-D are pages of musical notation for orchestration selected by the orchestration system of this invention for the melody line for "Over The Rainbow"
Figure 3B:
Figure 3C:
Figure 3D:
Figure 4A:
FIGS. 4 A-E are pages of musical notation for orchestration selected by the orchestration system of this invention for the melody line for "76 Trombones"
Figure 4B:
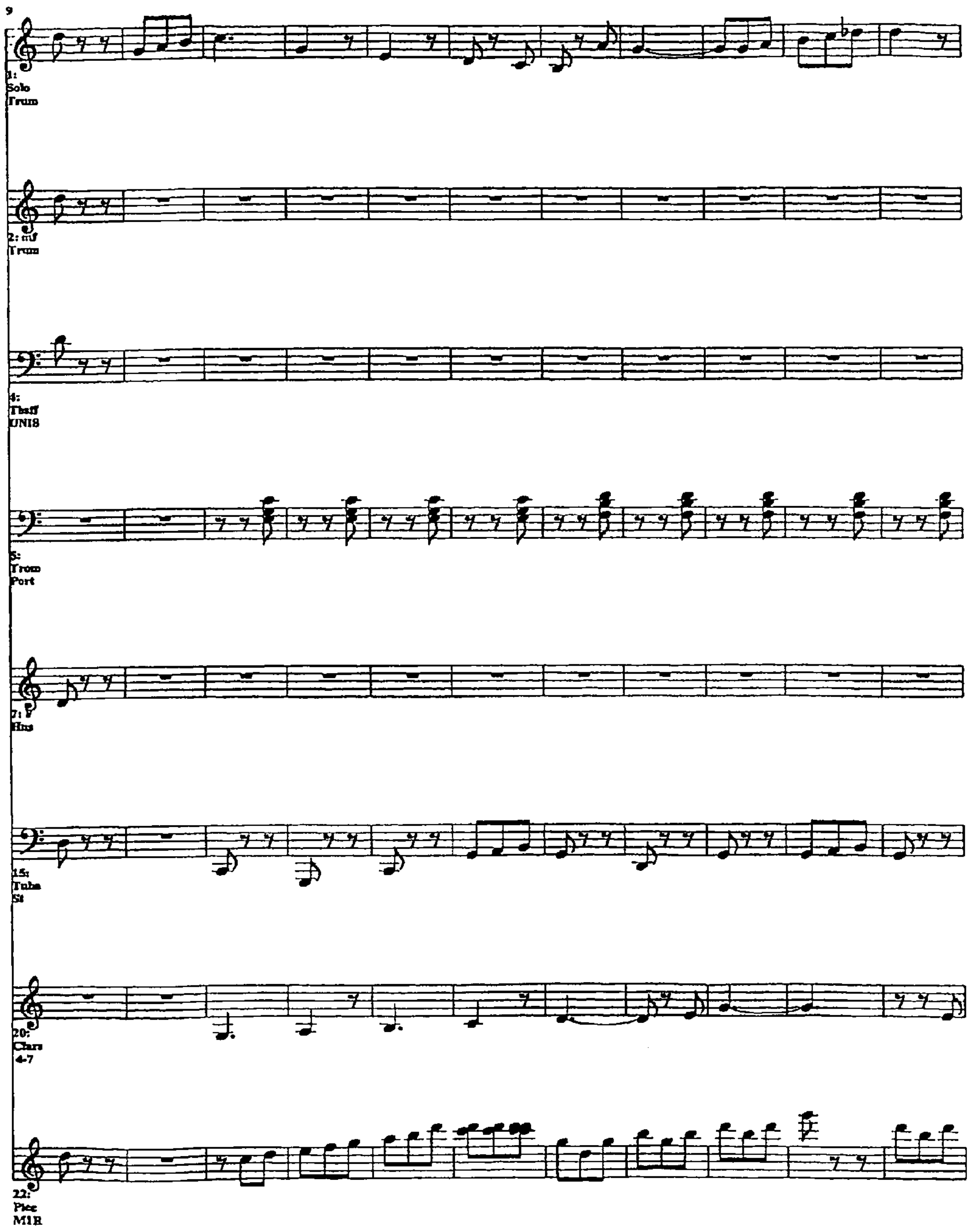
Figure 4C:
Figure 4D:
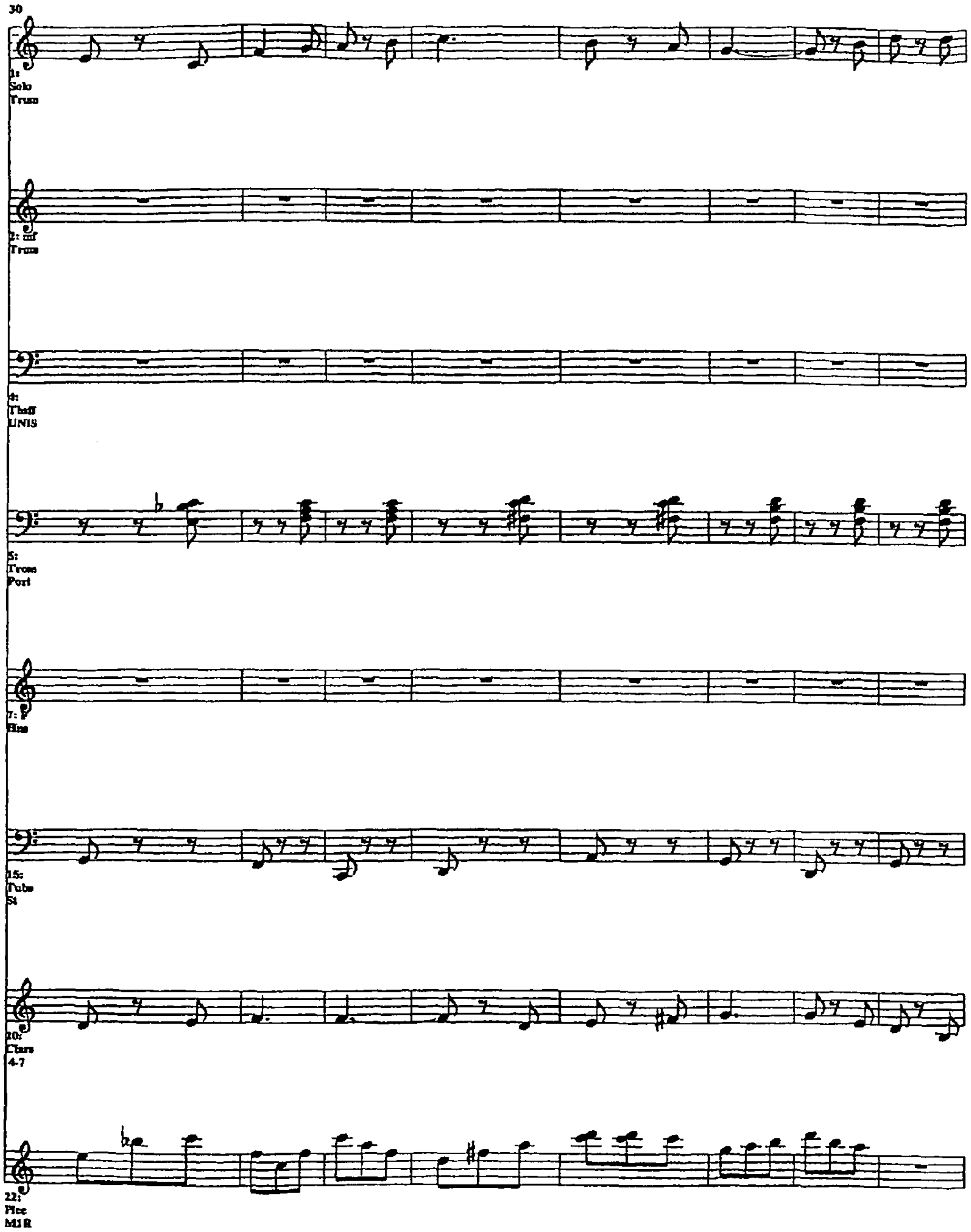
Figure 4E:
Figure 5A:
FIGS. 5 A-D are pages of musical notation for orchestration selected by the orchestration system of this invention for the melody line for "Back Home Again In Indiana"
Figure 5B:
Figure 5C:
Figure 5D:
Figure 6A:
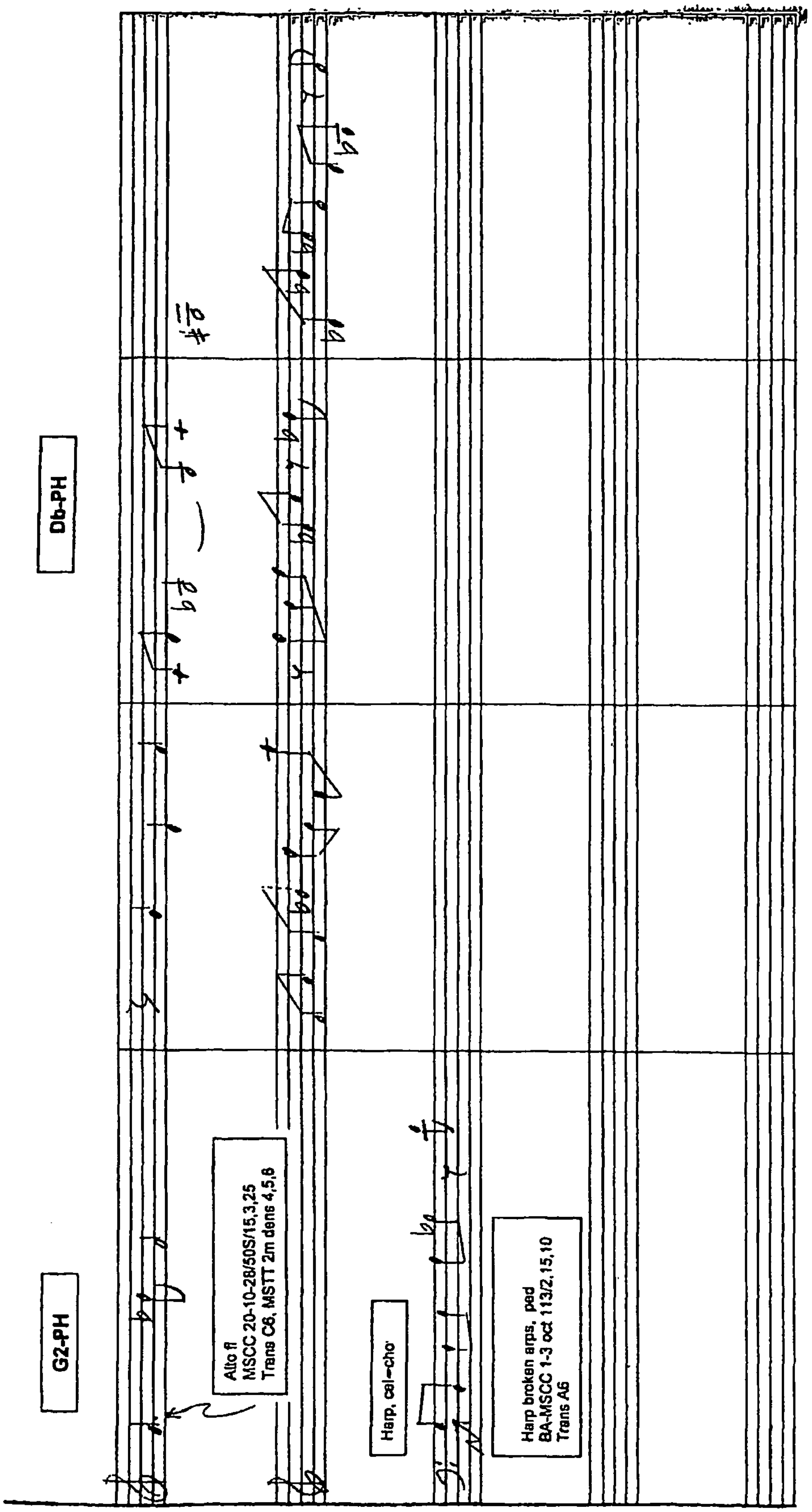
FIGS. 6 A-R are pages of musical notation for composition and orchestration automatically selected to synchronize with scenes from a video of a trip to Zion National Park.
Figure 6B:
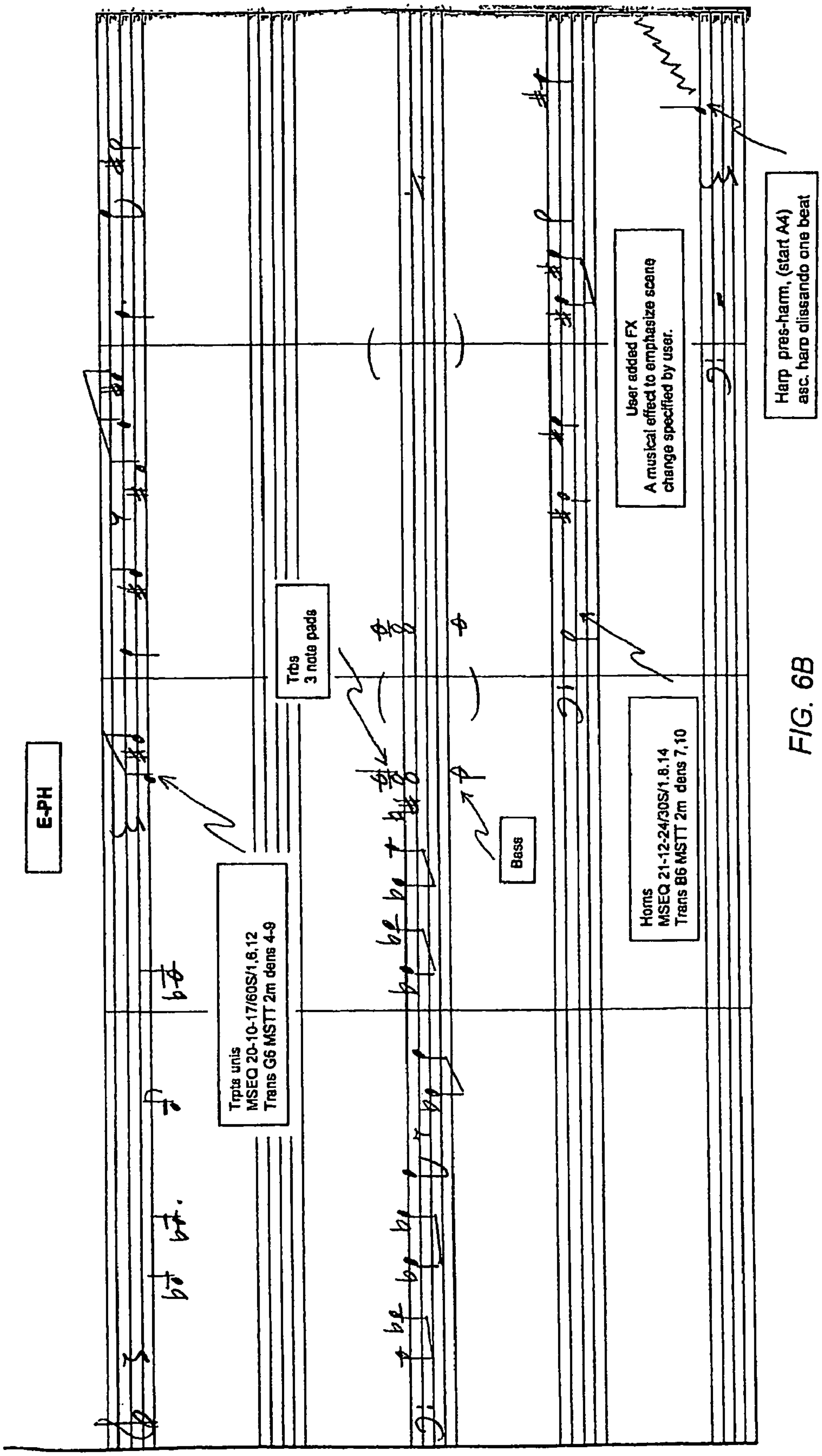
Figure 6C:
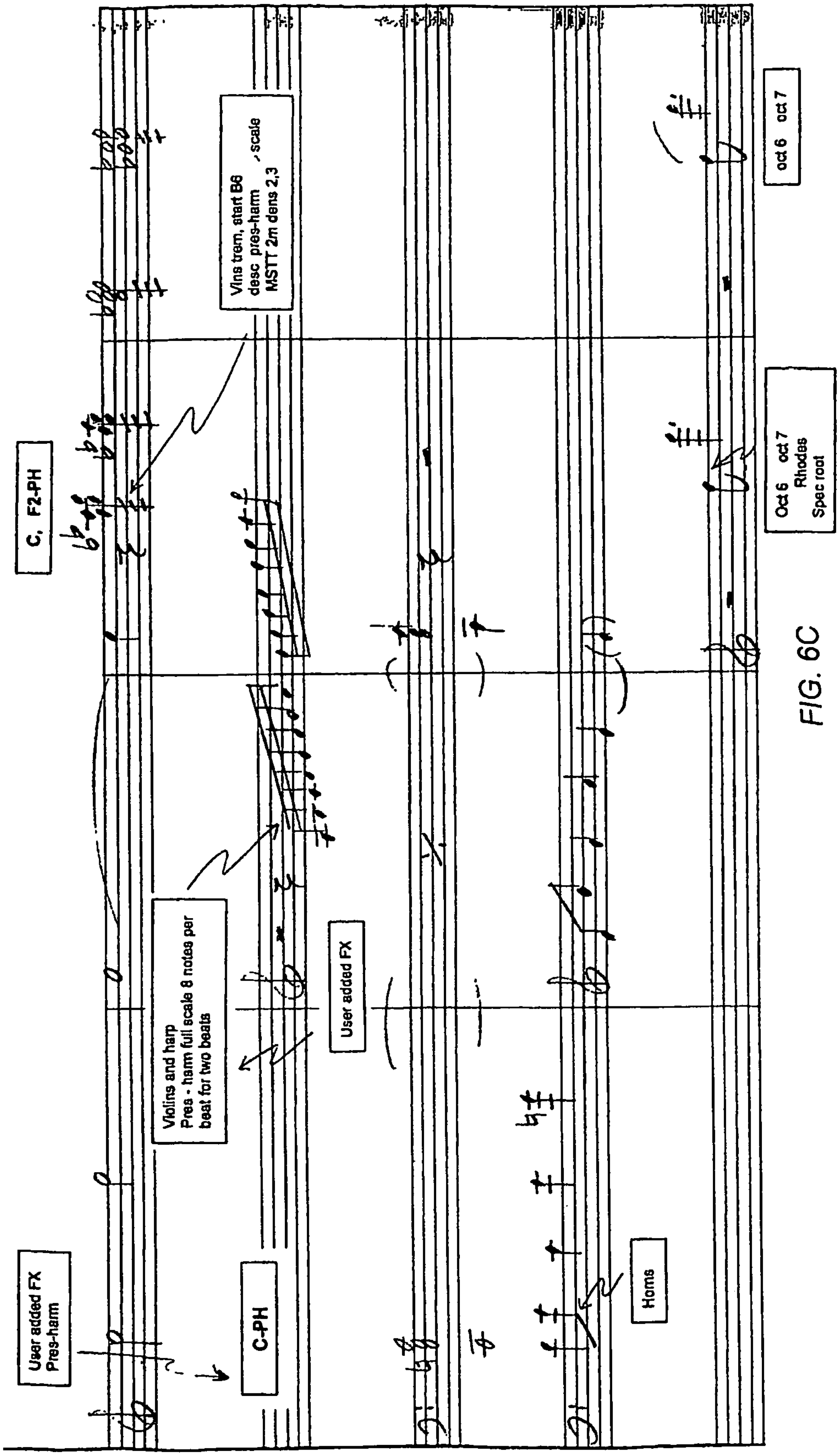
Figure 6D:
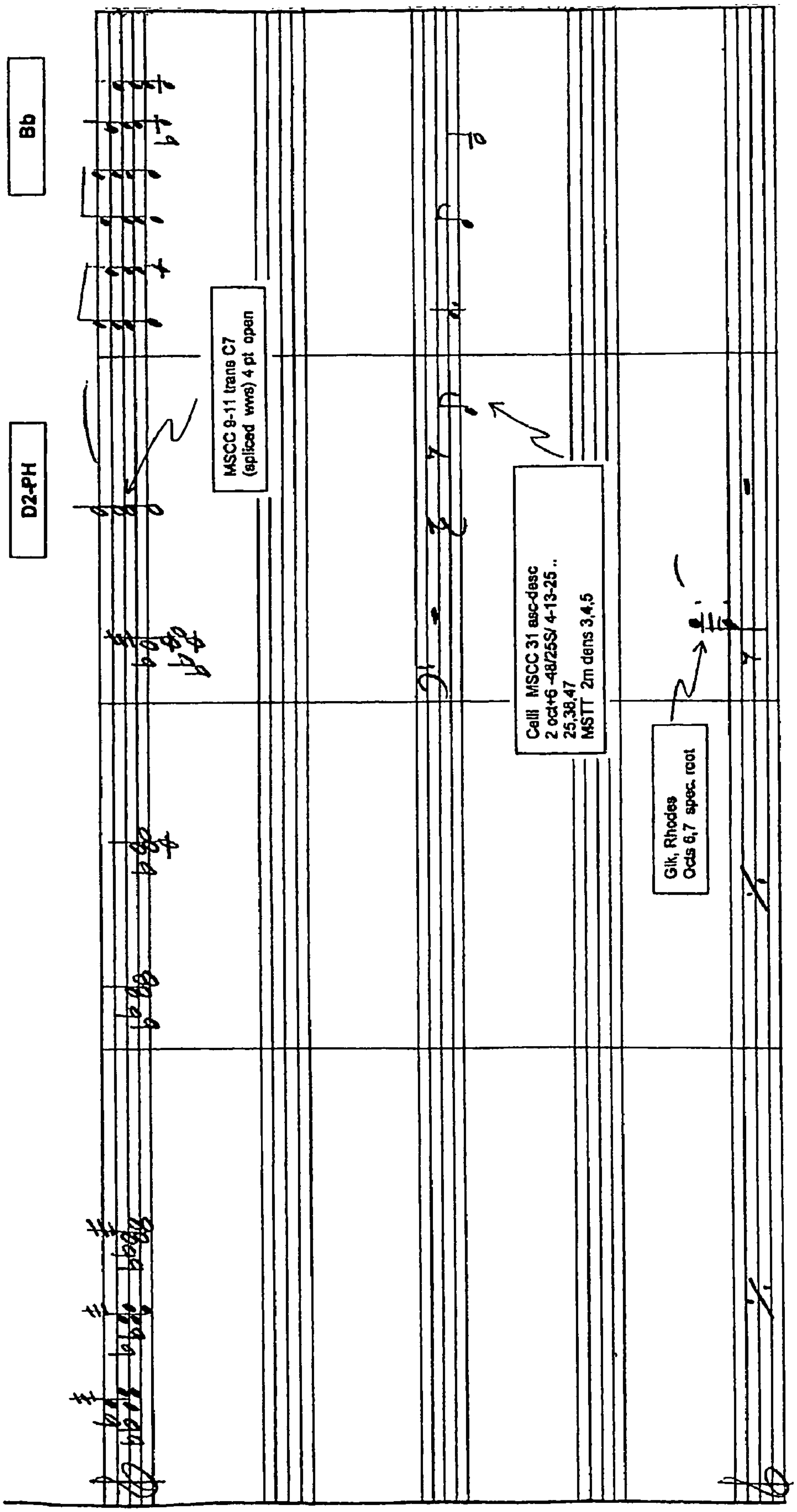
Figure 6E:
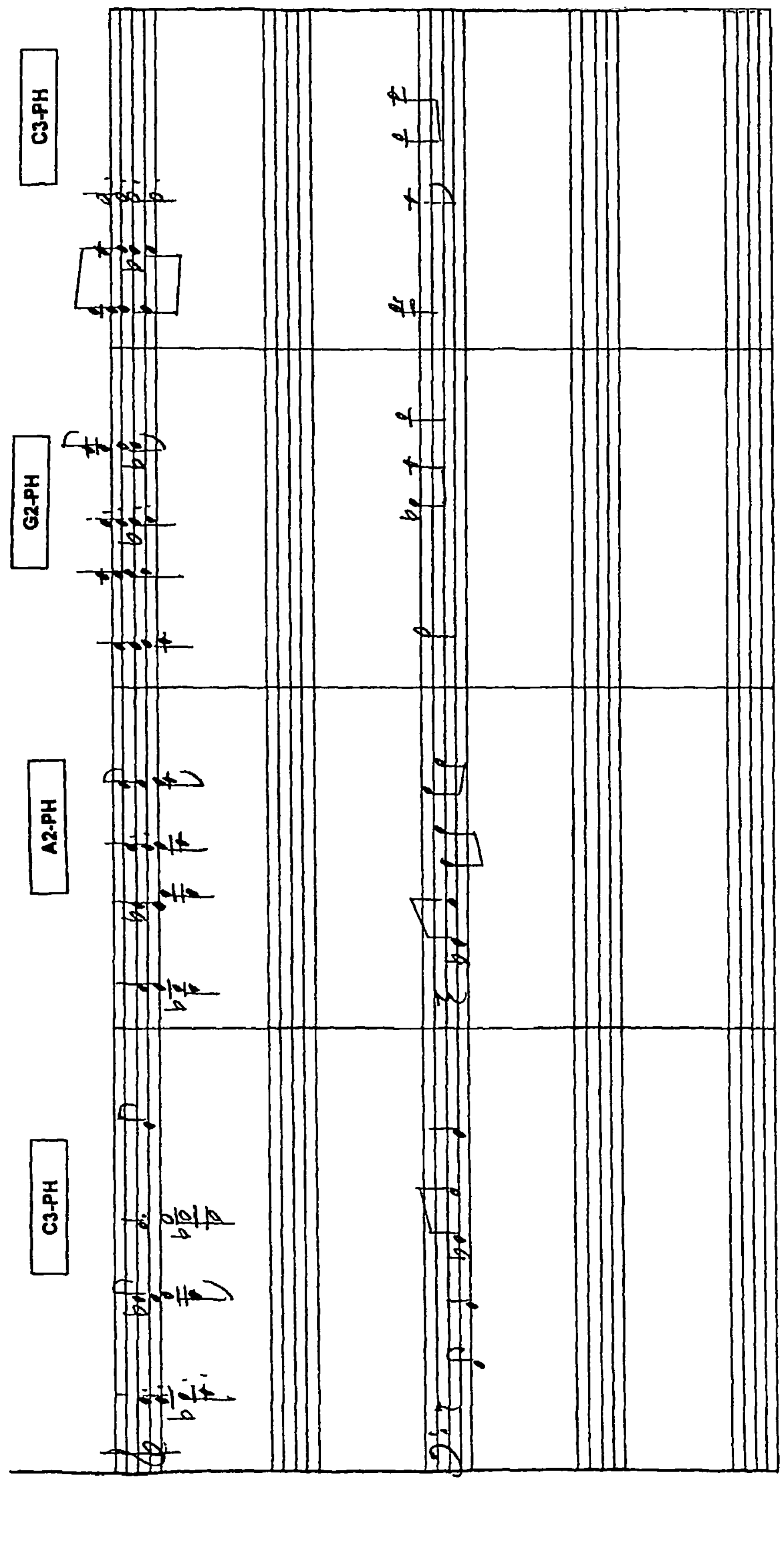
Figure 6F:
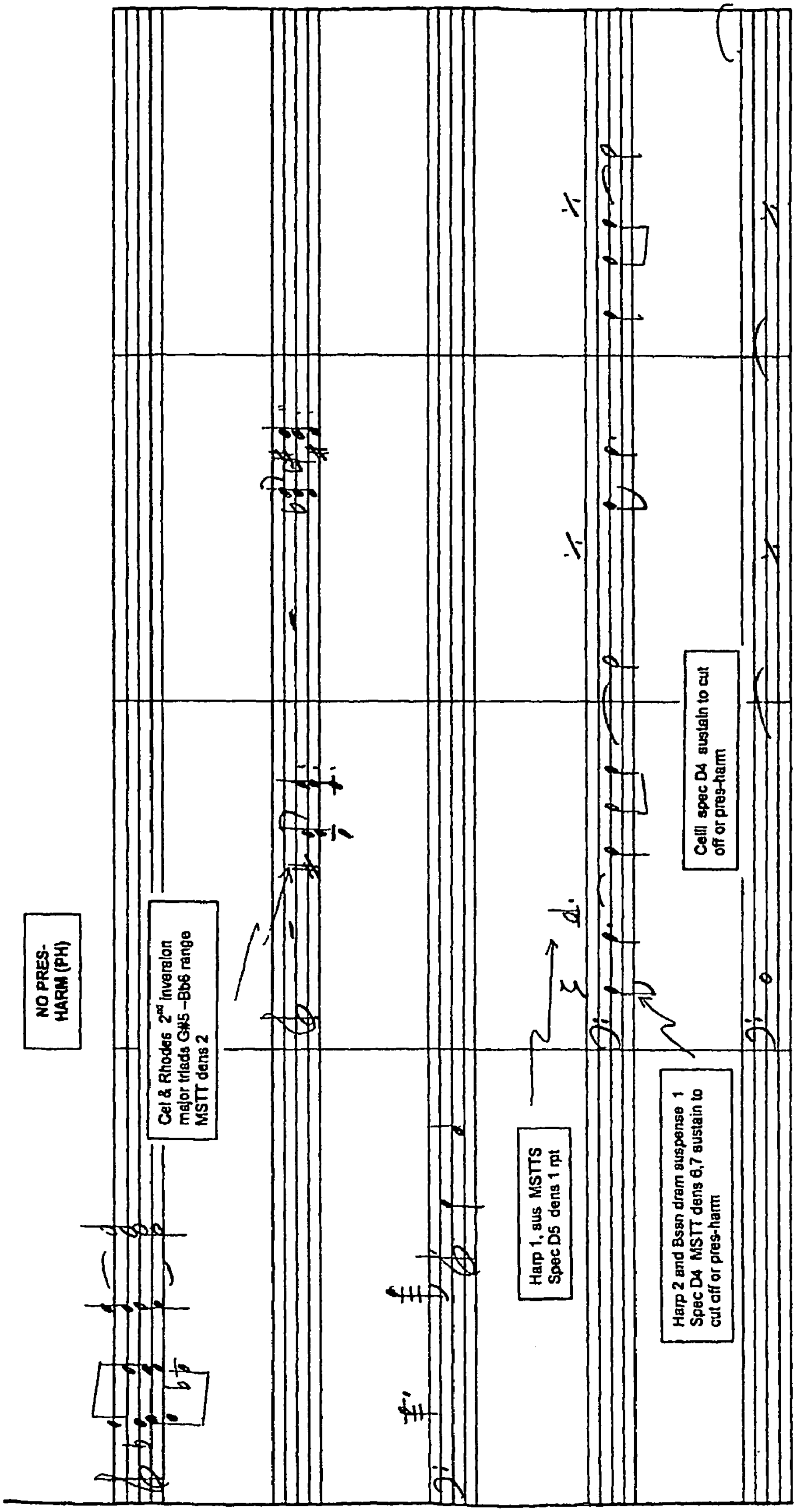
Figure 6G:
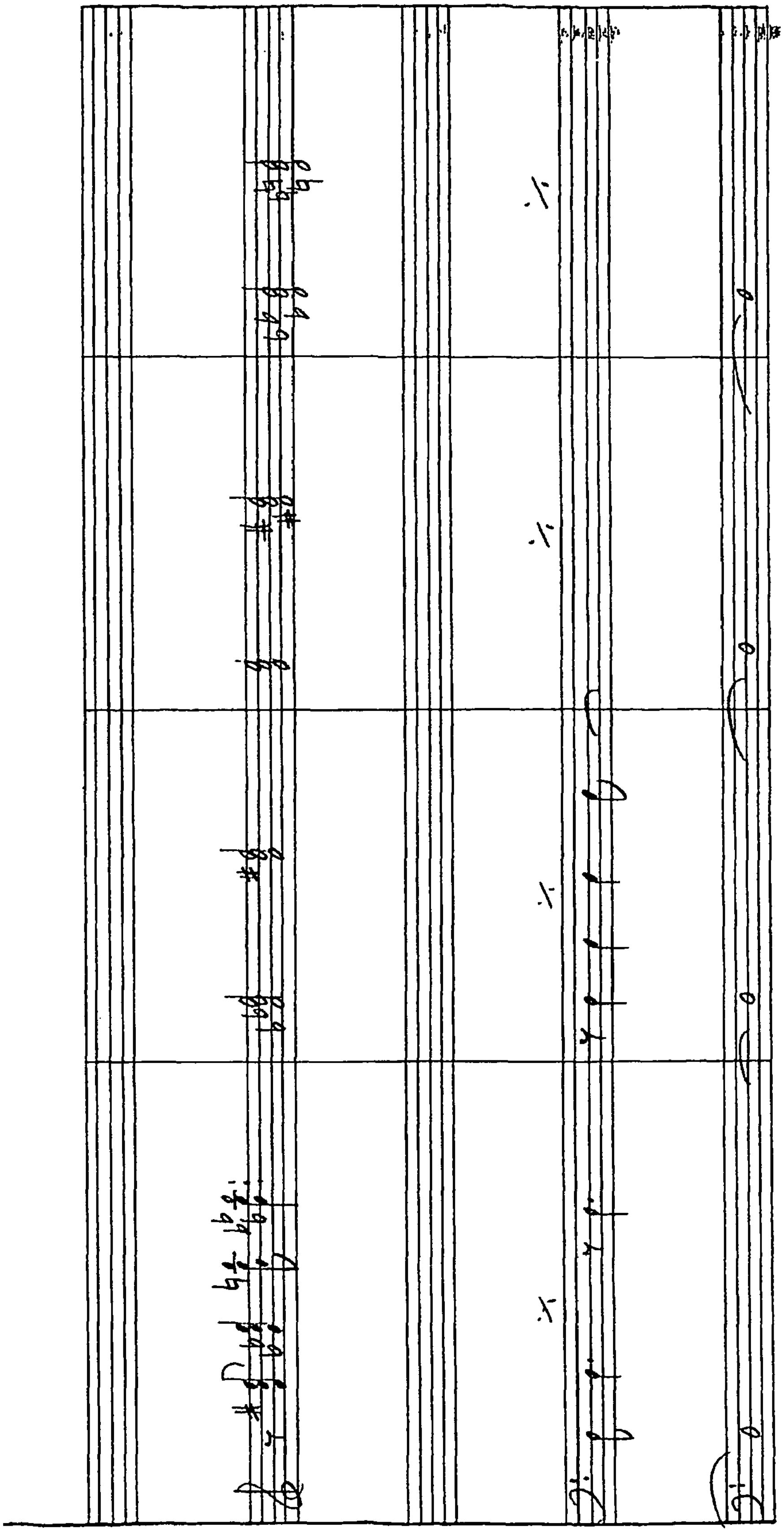
Figure 6H:
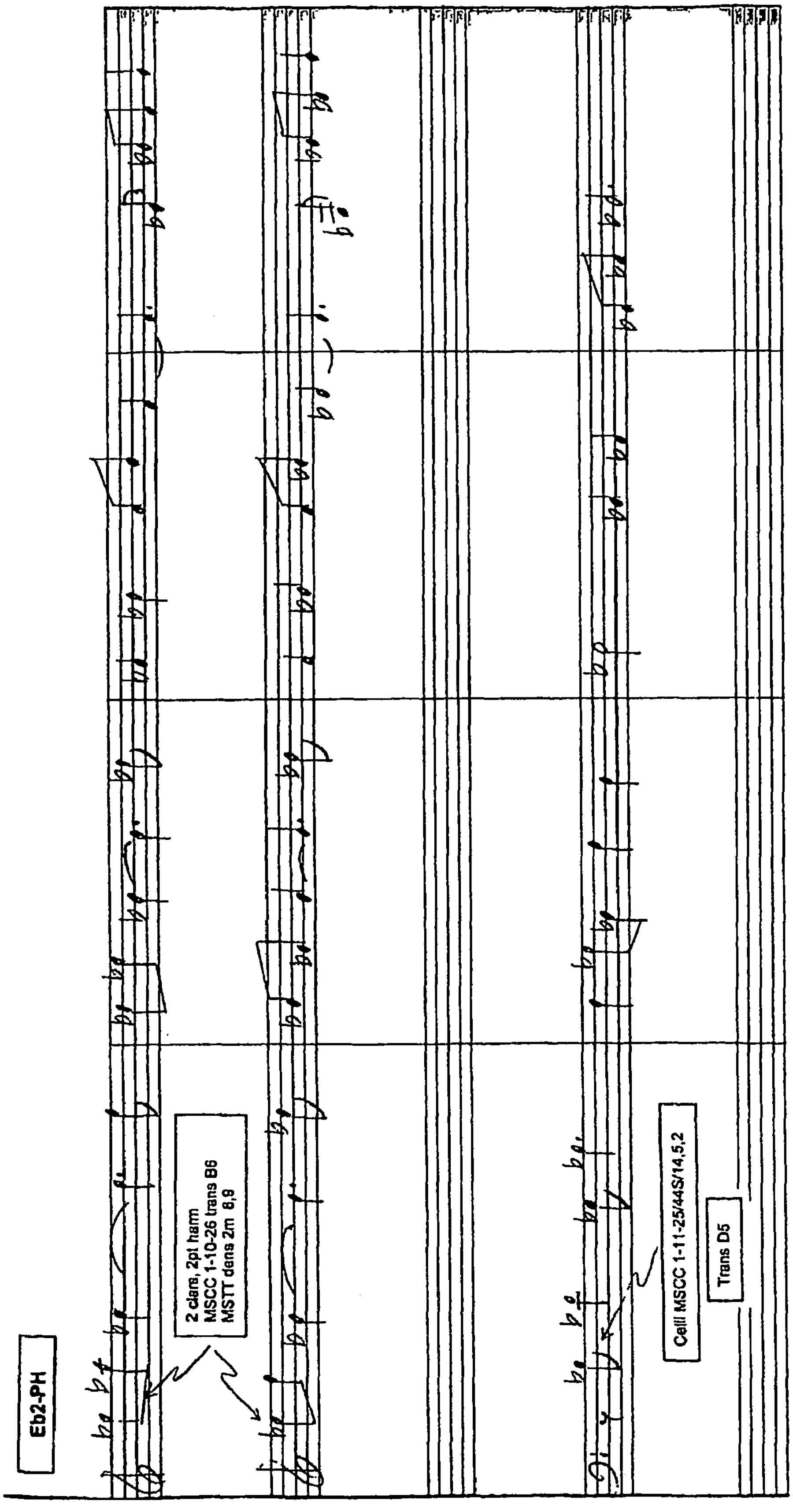
Figure 6I:
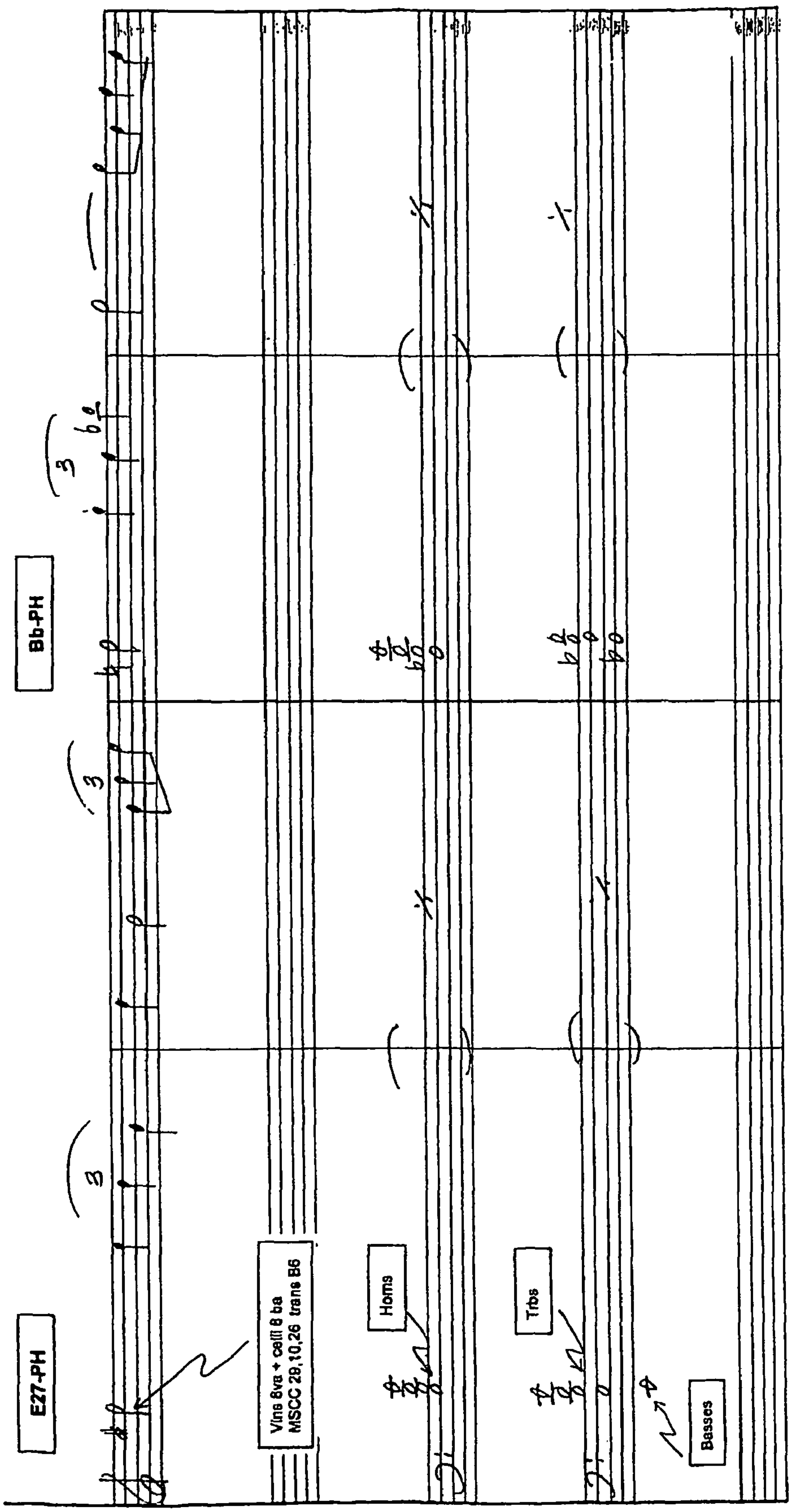
Figure 6J:
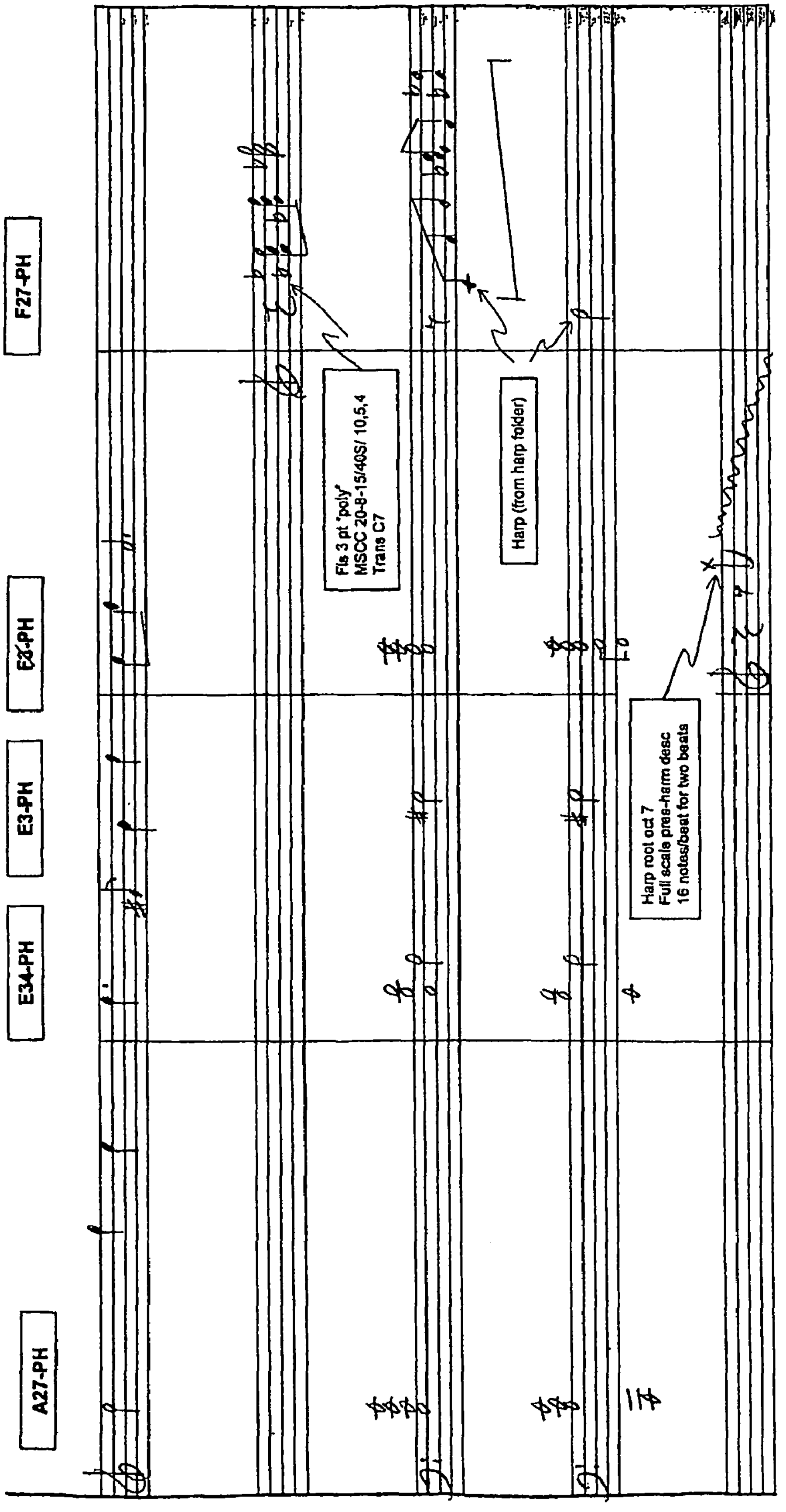
Figure 6K:
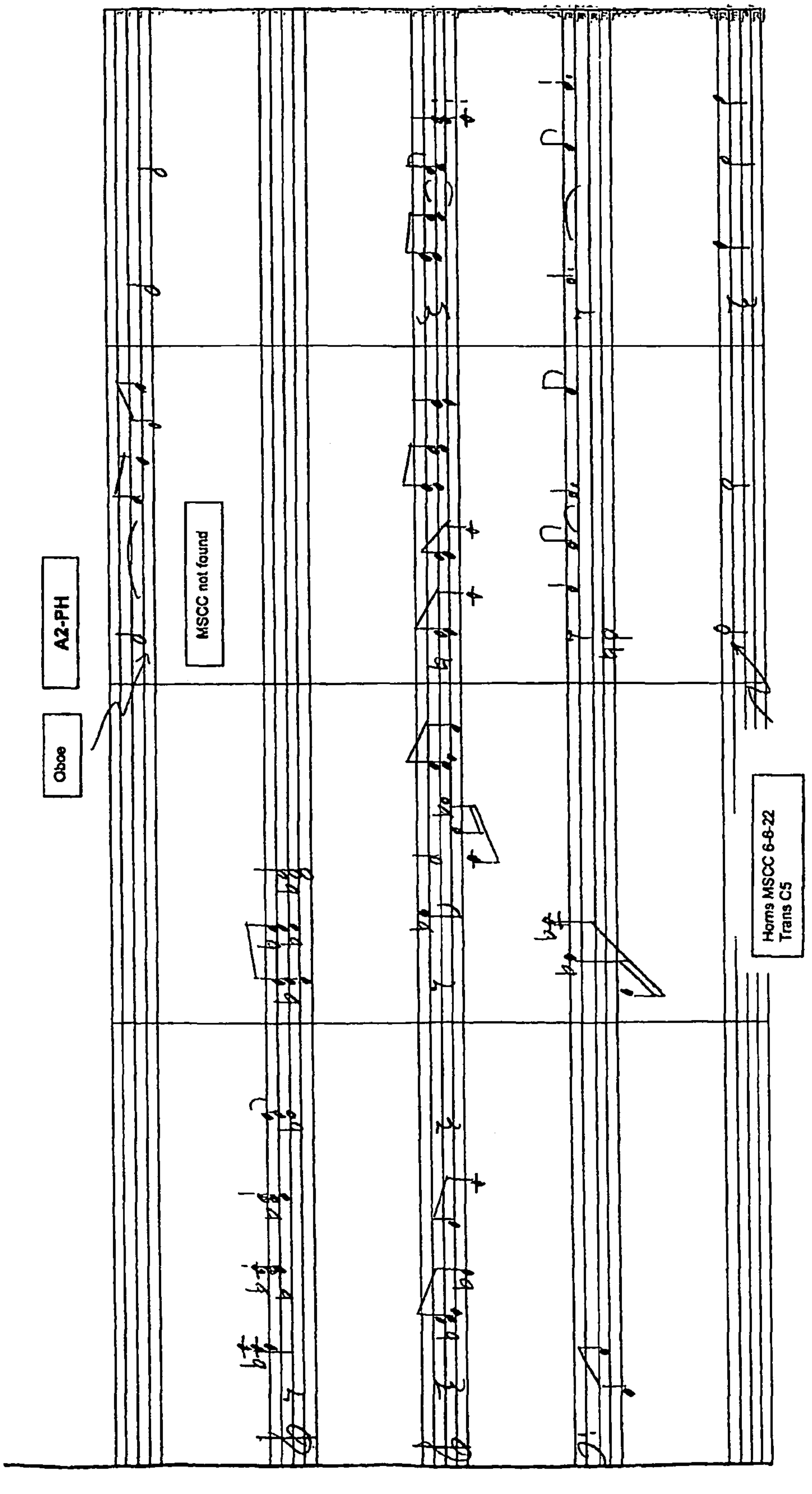
Figure 6L:
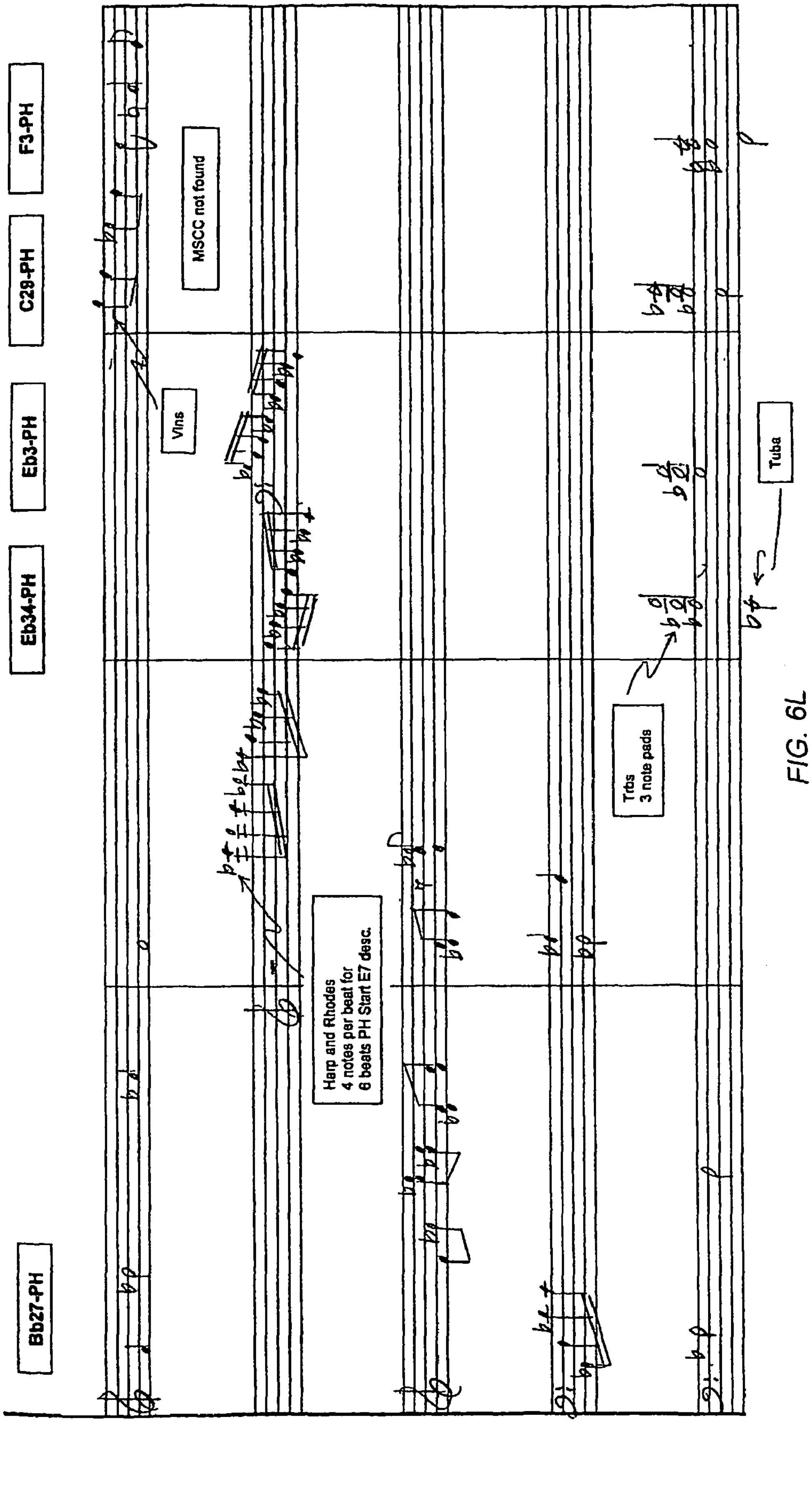
Figure 6M:
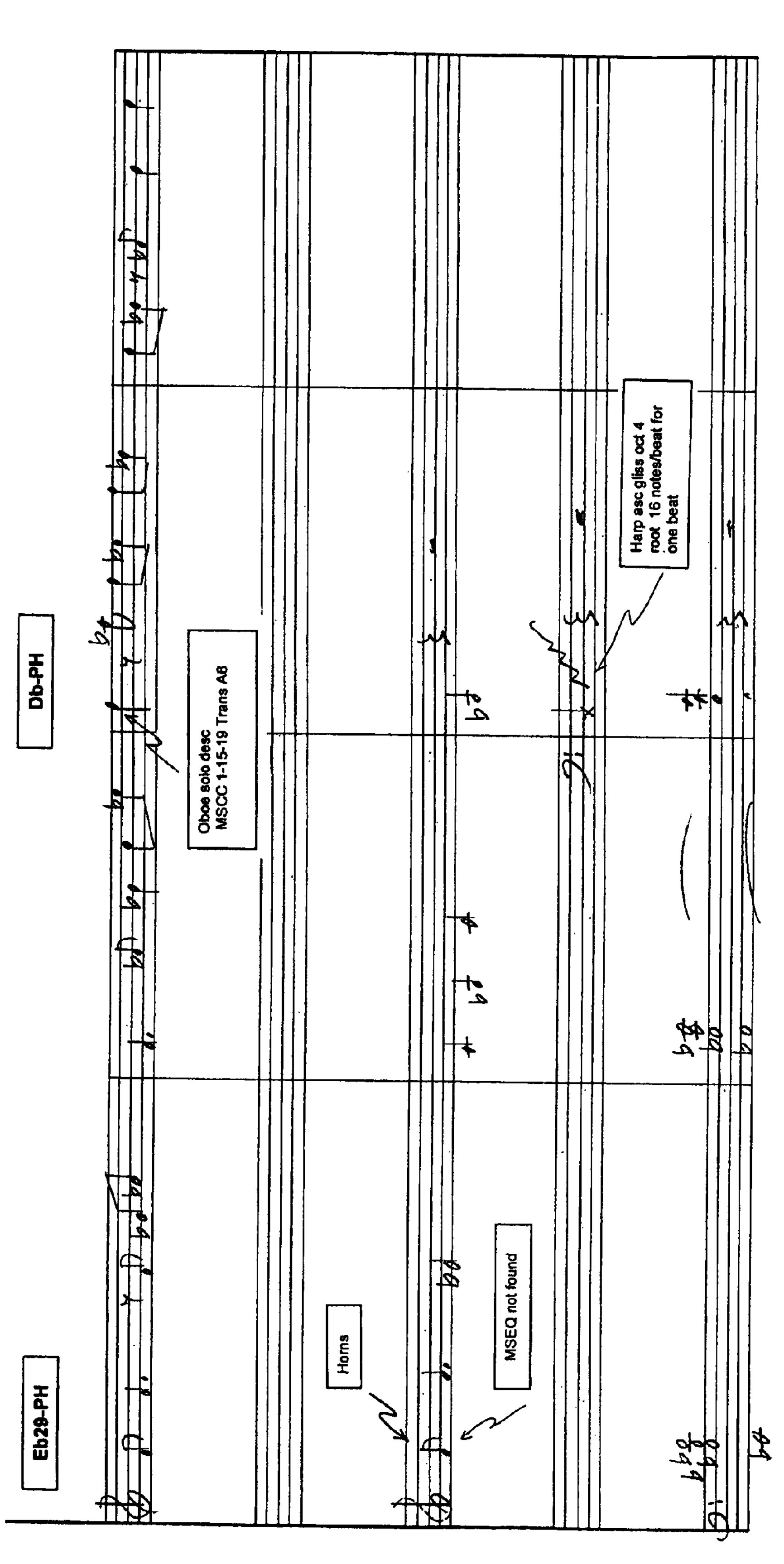
Figure 6N:
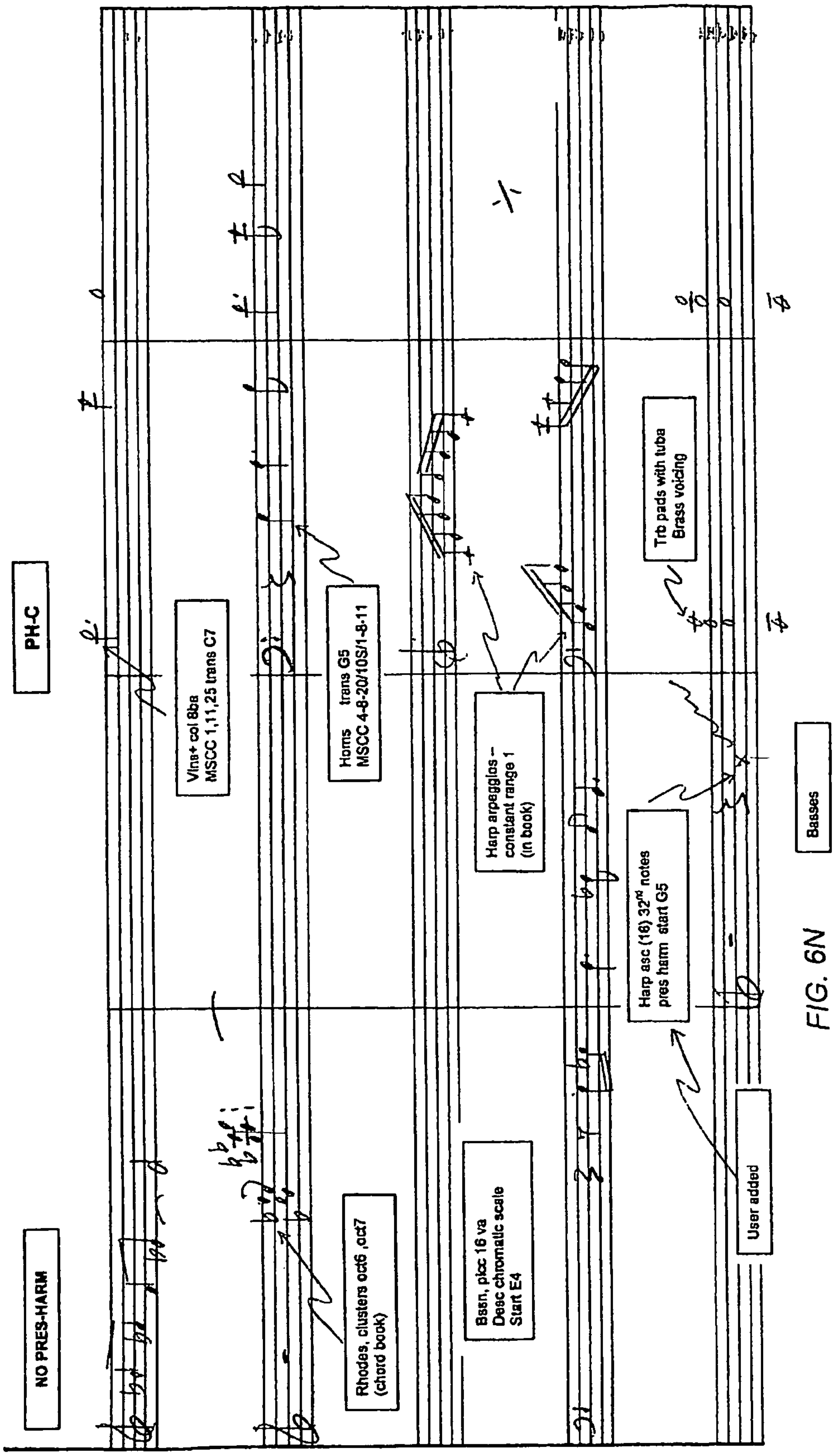
Figure 6O:
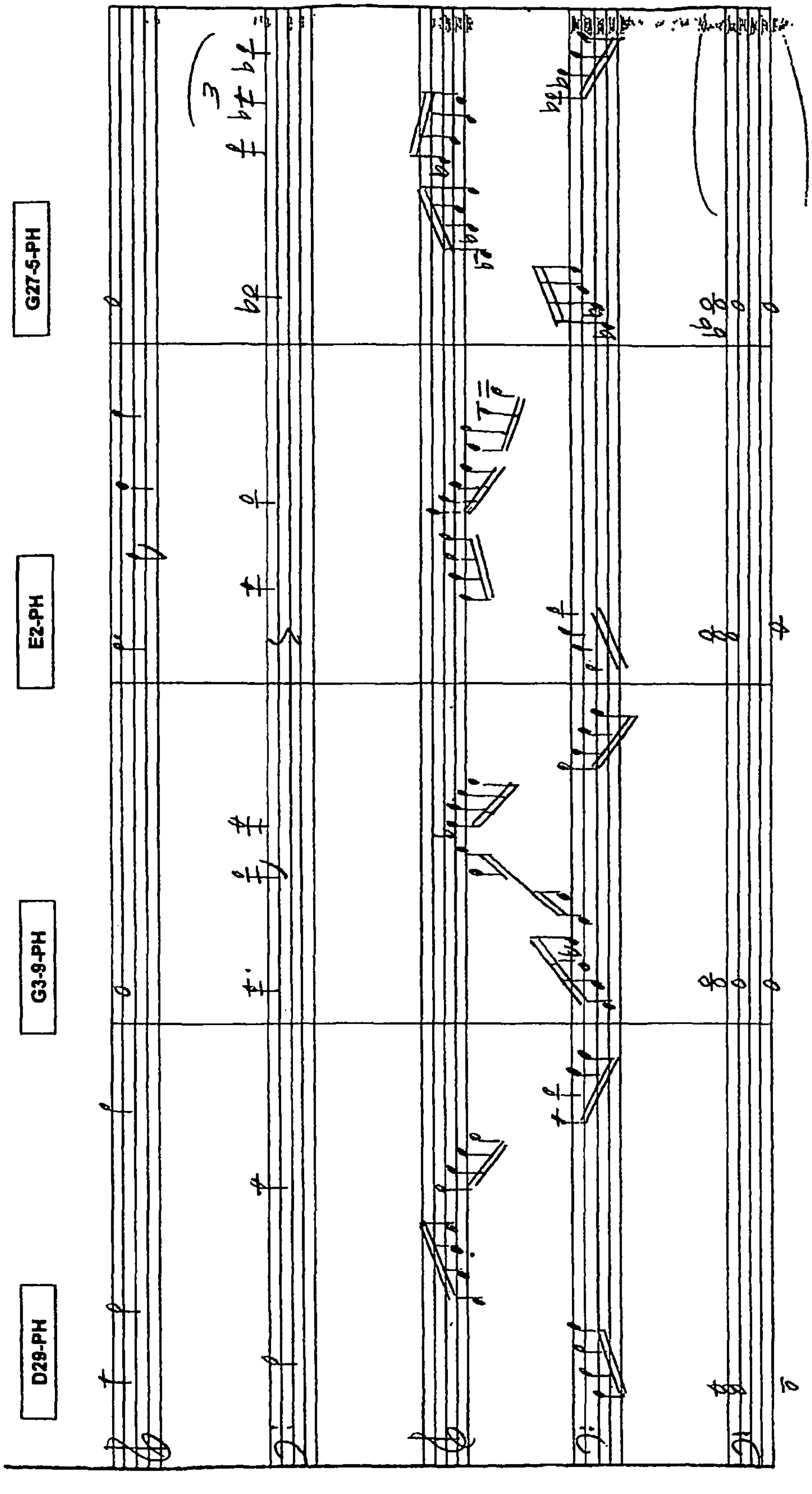
Figure 6P:
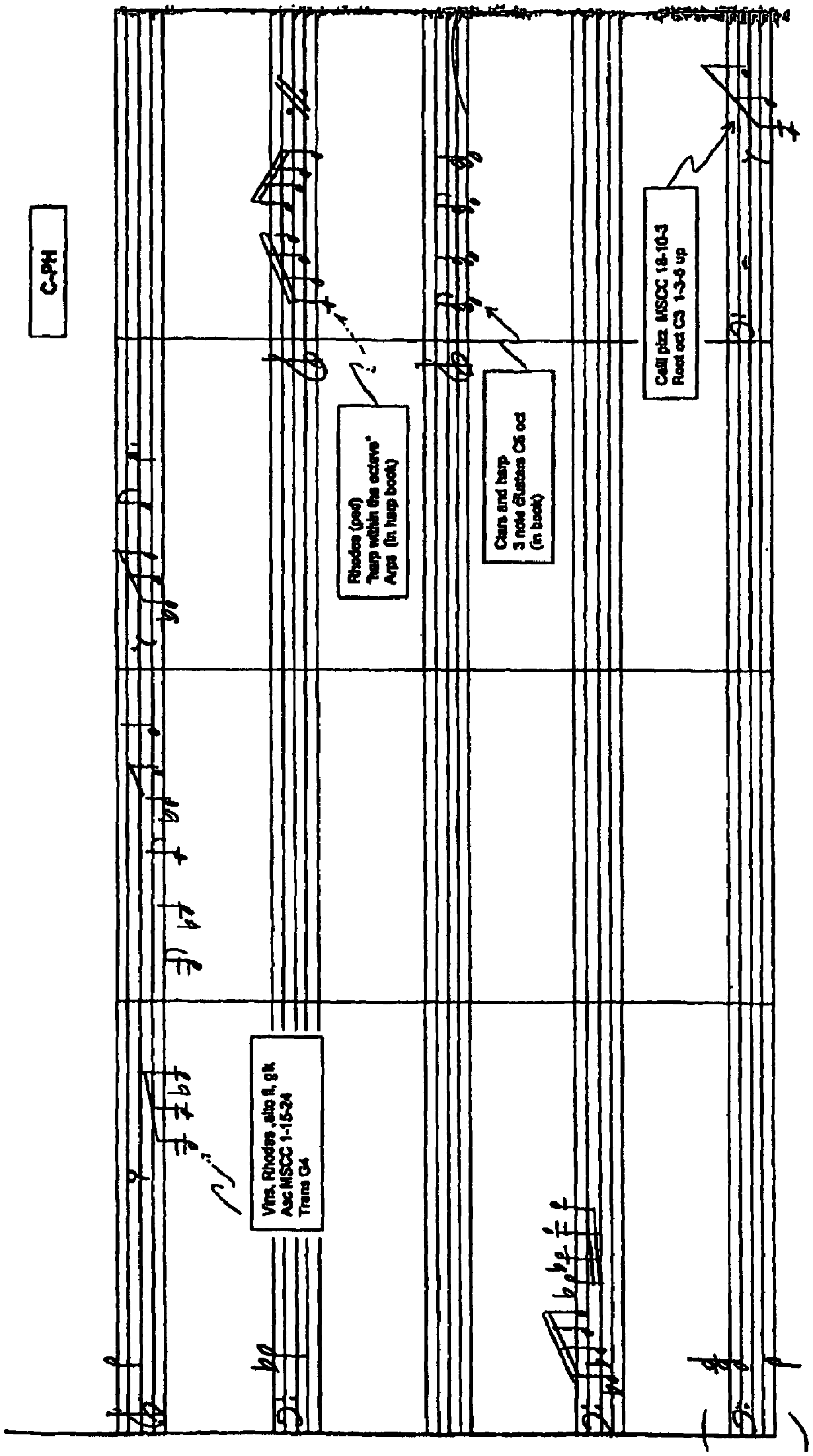
Figure 6Q:
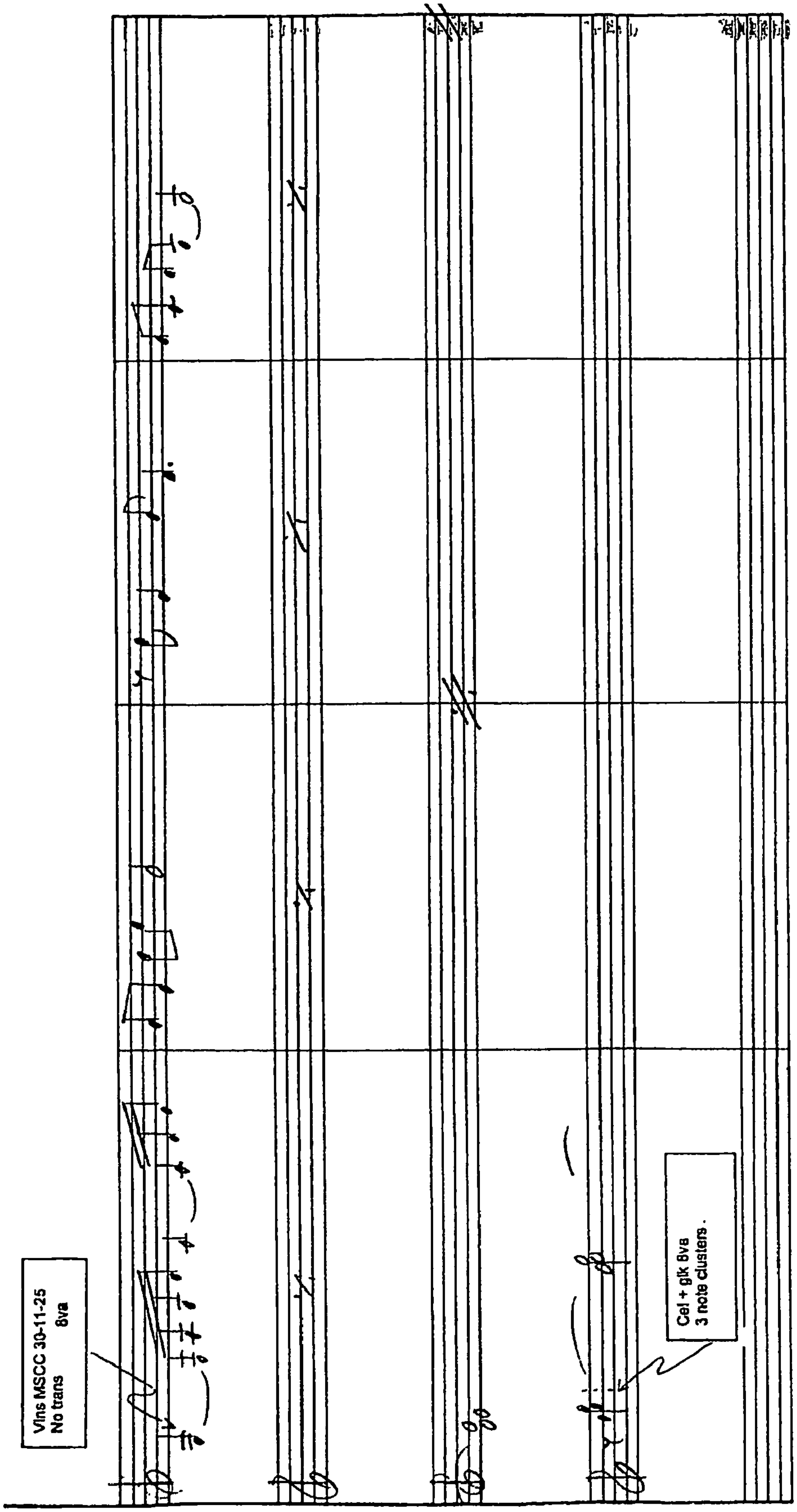
Figure 6R:
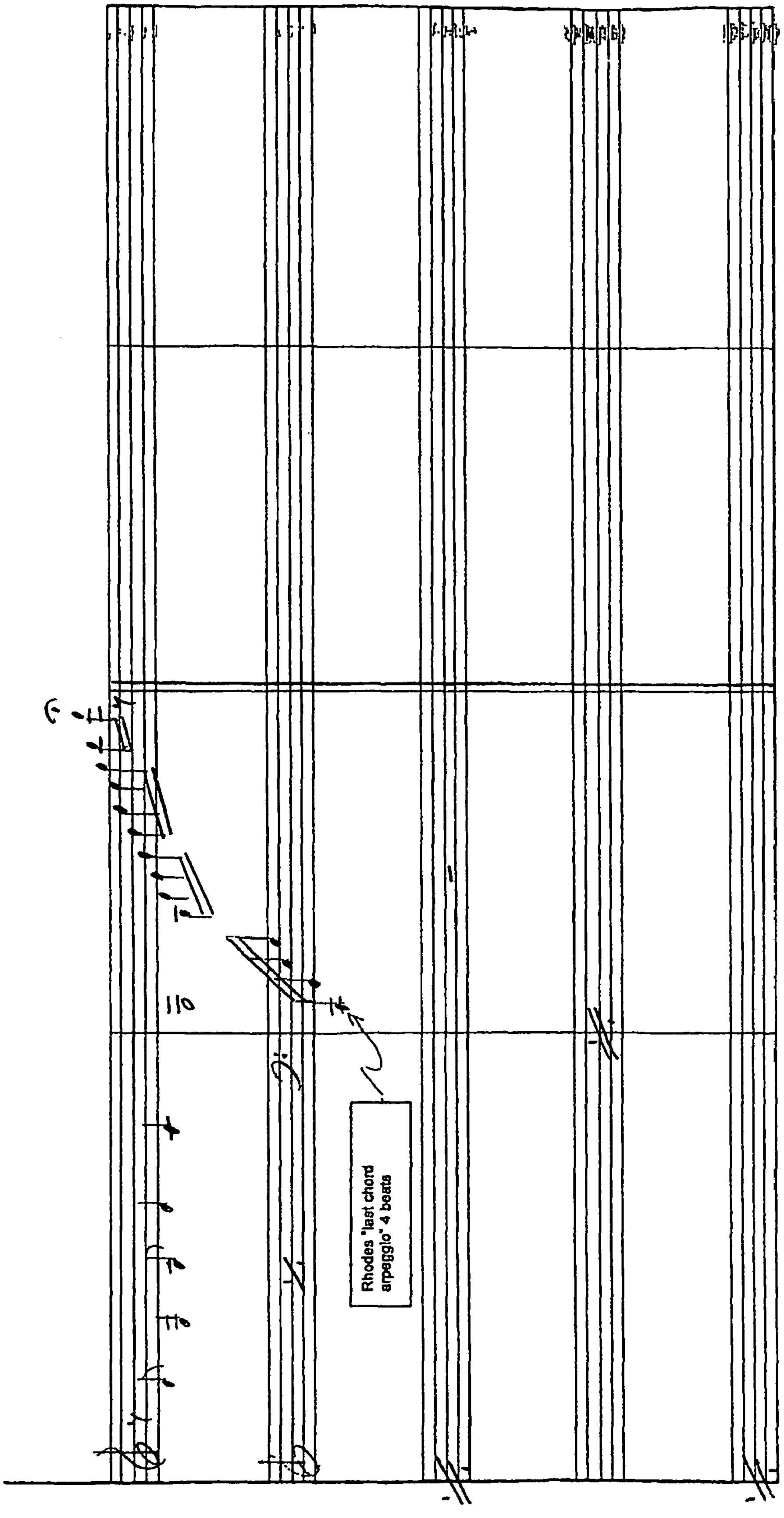

FIGS. 2 A-C are pages of musical notation for orchestration selected by the orchestration system of this invention for the melody line for "Darn That Dream". This is a demonstration of professional string voicing applied to the melody note. As the melody is played in different octaves, the COS voices the strings in the manner of a professional orchestrator. These chord voicings are never symmetrical and can cover a range of from ½ octave to three octaves. This produces smooth transitions and a professional sound.

EXAMPLE 2

"Over the Rainbow"

FIGS. 3 A-D are pages of musical notation for orchestration selected by the orchestration system of this invention for the melody line for "Over The Rainbow" This is one example of the complex orchestrations which can be accomplished by the COS.

First Phrase

The COS generates the harp glissando intro

The played melody is unison celli and COS harmonized high tremolo violins

The COS generates a high register counter melody played by celeste and orchestra bells.

Second 8 Phrase

The played melody is COS harmonized strings.

The COS generates a traditional harp accompaniment

Third Phrase

The played melody is an oboe.

The COS generates a harmonized counter melody played by tremolo strings.

The COS generates another counter melody played by the orchestra bells

The COS generates a lush ascending counter melody played by the celli

The COS generates low register arpeggios played by the harp followed by a harp glissando Fourth Phrase The played melody is a solo trumpet The COS generates the low register accompaniment played by brass and basses The COS generates a counter melody played by unison violins and glockenspiel

EXAMPLE 3

"Seventy Six Trombones"

FIGS. 4 A-E are pages of musical notation for orchestration selected by the orchestration system of this invention for the melody line for "76 Trombones"

Introduction (4 Measures)

No played melody

The COS generates a melody played by trumpets for the introduction

The COS generates a counter melody played by trombones and tuba

The COS generates another counter melody played by orchestra bells and piccolos

The COS generates high woodwind trills

The COS adds concert cymbals

First Phrase (16 Measures)

The played melody is unison trumpets

The COS generates a counter melody played by horns

The COS generates another counter melody played by piccolos

The COS generates a march accompaniment played by trombones and tuba

Second Phrase (16 Measures)

The COS harmonizes the played melody in three parts for trumpets

The COS generates a counter melody played by trombones and tuba

The COS generates another counter melody for the piccolos

Third Phrase (16 Measures)

The played melody is unison horns

The COS generates a counter melody played by unison clarinets

The COS generates a march accompaniment played by trombones and tuba

The COS generates another counter melody for orchestra bells and three-part harmony for woodwinds

EXAMPLE 4

"My Romance" and "Two for the Road"

The played melody to "My Romance" is an alto sax
The played melody to "Two For The Road" is a vibraphone Acoustic Guitar and Bass Provide the Rhythm The COS generates a non-repetitive harmonized counter melody which is voiced for a vocal group for both songs.

EXAMPLE 5

"Back Home Again in Indiana"

FIGS. 5 A-D are pages of musical notation for orchestration selected by the orchestration system of this invention for the melody line for "Back Home Again In Indiana. This song is played in the "Dixieland" style. The played melody is a trumpet. The COS generates both the clarinet and trombone counter melodies which are non-repetitive. Bass and guitar supply the rhythm. Whichever instrument (trumpet, clarinet or trombone) the player plays, the COS will generate the other two "Dixieland" parts. The COS can also generate a fourth tenor sax part.

EXAMPLE 6

"Laura"

First Phrase

The played melody is an alto sax.

The COS generates the high portion of the Hi-Lo Chord System which is played by violins The COS generates the low supporting harmony chord pads played by the celli Bass and rhythm guitar provide the rhythm throughout except for the last phrase Second Phrase Alto sax continues with the melody The COS generates a low register counter melody played by the celli.

The COS generates the low supporting harmony chord pads played by the brass

Third Phrase

The played melody is an oboe

The COS generates a counter melody played by the horns and celli

The COS generates the low supporting harmony chord pads played by the celli

The COS generates the high sustained chords played by the violins

Fourth Phrase

The COS harmonizes the played melody with strings and flutes

The COS generates a counter melody played by a trumpet

The COS generates a harp accompaniment of broken chords, arpeggios and glissandi Fifth Phrase The played melody is unison celli The COS generates a harmonized counter melody played by strings with added orchestra bells Sixth Phrase The played melody is again an alto sax The COS generates sustained brass chords which are harmonized in modern "second octave" style The COS generates a celeste counter melody which is harmonized with modern "poly" chords Seventh Phrase The COS harmonizes the played string melody The COS generates a counter melody played by unison celli The COS generates broken chord and arpeggiated figures played by the celeste Eighth Phrase The alto sax continues the played melody The COS generates solo jazz guitar accompaniment in the style of Joe Pass.

EXAMPLE 7

"One Morning in May"

There is no player playing a melody.

The COS generates ad lib jazz solos (melodies) for alto sax, jazz guitar, trumpet and vibes.

Rhythm is provided by Rhodes electric piano, acoustic guitar, bass and drums.

EXAMPLE 8

"Musetta's Waltz"

Introduction (One Measure)

The COS generates a harp gliss

No played melody

First Phrase (16 Measures)

The played melody is alto flute

The COS generates "Classical" type harp accompaniment

Second Phrase (16 Measures)

The played melody is a "C" flute

COS generated harp accompaniment continues

The COS generates a unison celli counter melody

The COS generates a harp glissando ending

EXAMPLE 9

"Sax Section"

COS generated melody harmonized for four saxophones

EXAMPLE 10

"Lover"

"The Banjo Player" (1)

This is an example of the COS Bluegrass five-string banjo style.

The played melody is "Lover"

The COS incorporates the played melody into the complex figures played by the five-string banjo.

Current five-string banjo accompaniment styles do not incorporate the played melody into the complex figures the five-string banjo is playing First Phrase (32 Measures)

The played melody is a banjo

The COS incorporates the played melody into the five-string banjo figures

String bass and rhythm guitar provide rhythm throughout.

Second Phrase (32 Measures)

The played melody is a banjo

The COS incorporates the played melody into the five-string banjo figures

The COS generates "country style" accompaniment figures for the steel guitar

Ending

The COS generates a banjo figure for the ending

EXAMPLE 11

"June Night"

"The Banjo Player" (2)

This is an example of the COS four-string (plectrum) banjo style which is completely different from the COS Bluegrass style.

The played melody is "June Night"

Using a different technique from the COS Bluegrass technique, the COS incorporates the played melody into the complex figures played by the four-string banjo.

Current four-string banjo accompaniment styles do not incorporate the played melody into the complex figures the four-string banjo is playing.

First Phrase (16 Measures)

The played melody is banjo with added vibraphone

The COS generates the repeated banjo figures and incorporates the played melody into those figures Acoustic bass and guitar play rhythm throughout.

Second Phrase (16 measures)

The played melody is banjo

The COS generates the repeated banjo figures and incorporates the played melody into those figures The COS harmonizes voices which are added to the melody

EXAMPLE 12

"Some One to Watch Over Me"

This is in the contemporary style of the latest Rod Stewart "best selling" CD

First Phrases (16 Measures)

The played melody is a trombone

The COS Hi-Lo Chord System sustained string voicing extends over 4½ octaves providing a full string accompaniment Second Phrase (8 Measures)

The played melody is alto sax

COS Hi-Lo Chord System accompaniment continues

The COS generates a harp glissando into the third phrase

Third Phrase (8 Measures)

The played melody is celli.

The COS Hi-Lo Chord System generates very high sustained string line

The COS generates sustained trombone chords

The COS generates a counter melody played by horns

The COS generates another counter melody played by celeste and glockenspiel

The COS generates a harp glissando at the end

EXAMPLE 13

"Strike Up the Band"

First Phrase (16 Measures)

The played melody is a vibraphone

The COS generates a counter melody played by the sax section which interacts with the brass The COS generates another counter melody played by the brass which interacts with the saxes Acoustic guitar and bass provide the rhythm throughout Second Phrase (8 Measures)

The vibraphone played melody continues

The COS generates a counter melody played by the horns

The COS generates sustaining "chord pads" for saxes and brass

Third Phrase (8 Measures)

The played melody is a vibraphone

The COS generates a counter melody played by the sax section which interacts with the brass The COS generates another counter melody played by the brass which interacts with the saxes Fourth Phrase (16 Measures)

There is no played melody from here to the end

The COS generates a jazz guitar ad lib solo which is now the melody

The COS generates the sustained accompaniment played by the saxes

Fifth Phrase (8 Measures Plus Ending)

The COS continues to generate the jazz guitar ad lib solo melody

The COS generates a harmonized counter melody played by the brass

The COS generates another harmonized counter melody played by the saxes

The COS generates harmonized brass figures which support the sax figures

The COS generates a melodic figure for the ending which is played in unison by the jazz guitar and vibes The COS generates harmonized melodic figures for both brass and saxes to support the ending

EXAMPLE 14

"When Sunny Gets Blue"

The played melody is a vibraphone.

The COS generates a solo jazz guitar intro and accompaniment involving both single notes and chords in the style of Joe Pass and Barney Kessel.

EXAMPLE 15

"Green Dolphin Street"

The played melody is piano.

The COS generates counter melodic figures played by vibes and jazz guitar

The rhythm is acoustic guitar and bass.

EXAMPLE 16

"Song for My Father"

The played melody is a trumpet with a Harmon mute.

The COS generates counter melodic phrases harmonized in the "George Shearing" style and played by piano, jazz guitar and vibes.

The rhythm is acoustic guitar and bass.

EXAMPLE 17

"We'll be Together Again"

First Phrase (8 Measures)

The played melody is a vibraphone

The COS provides accompaniment with independently moving voices played by a typical sax section comprised of 2 altos, 2 tenors and baritone.

Second Phrase (8 Measures)

Continues as above

The COS adds an acoustic bass which interacts with the baritone sax.

Third phrase (16 Measures)

Continues as above

The COS generates a high string counter melody played by violins

An acoustic rhythm guitar is added.

EXAMPLE 18

"Bossa Nova"

First Phrase (16 Measures)

The played melody is a celeste.

The COS generates a counter melody played by unison celli

Acoustic guitar and bass provide rhythm

Second Phrase (16 Measures)

The played melody is an alto sax

The COS generates sustained high chords from the Hi-Lo Chord System played by violins.

The COS generates another counter melody which is played by unison celli.

Third Phrases (16 Measures)

The played melody consists of violins and celli in octaves.

The COS generates a harmonized counter melody played by flutes.

Fourth Phrase (16 Measures)

The played melody is unison voices.

The COS generates sustained brass chords which are harmonized in modern "second octave" style.

Ending (4 Measures)

The played melody continues as above

The COS generates an ascending sustaining melodic figure played by the celeste.

The COS generates a short bass figure for the ending.

EXAMPLE 19

"There Will Never be Another You" (Strings)

The played melody is a tenor sax

The COS generates a harmonized counter melody demonstrating various string voicings as accompaniment to a solo instrument.

Acoustic guitar and bass provide the rhythm.

EXAMPLE 20

"There Will Never be Another You" (Big Band W/End)

First Phrase (16 Measures)

The played melody is a flugal horn.

Acoustic guitar and bass provide the rhythm throughout

Second Phrase (15 Measures)

This is in the "Big Band" style.

The played melody is a trumpet

The COS generates a harmonized counter melodic line played by 4 saxes

The COS generates another counter melodic line played by 8 brass

These two melodic lines interact with each other.

Ending (4 Measures)

The sax section plays a "double time" ending along with brass chords.

The COS generates a "double time" ending played by saxes. The COS generates brass chords.

COVS

EXAMPLE 21

"A Hike in Zion"

FIGS. 6 A-R are pages of musical notation for orchestration automatically selected by the COVS to synchronize with scenes from a video of a trip to Zion National Park. All of the elements used in the first eight measures were selected from the "very light scenic" category. The flute appeared as result of the almost American Indian type because the flute is the most common American Indian instrument.

Measure 1—the harmony is G2 (G minor) (5.27/10 in COVS terms)

An alto flute plays a simple melody based on the MSCC-10-28/50S/15, 3, 25, trans C6. This covers an interval of a $10^{th}$, has 28 notes, 50% skips with C6 as the highest note, this is a good register for the alto flute as the lowest note on the alto flute is G below "middle" C meaning it can play the G# if a downward transposition is necessary.

MSTTs have densities of 4, 5 or 6 meaning 4, 5 or 6 notes in two measures. This will set a very quiet mood.

Harp BA-MSCC broken arpeggios, 1-3 oct-113/2, 15, 10. 113 notes, 3 octave range This accompaniment is that of a harp doubled with a celeste. Trans A7 means the highest note can be A7. This is a very quiet and nice full mid register for the harp and the broken arpeggios. The unison celeste is chorused for a soft ensemble sound.

Measure 3.5—The harmony changes to +1.1/12 (Db) and the flute and harp continue the same accompaniment.

Measure 6.5—The harmony changes to 3.1

Trumpets play unison according to MSCC 20-10-17/60S/1, 6, 12 trans G6. The MSTT indicates a density of 4, 9.

The change of harmony of the third beat means that the first beat of MSCC20 now starts on beat three of measure 6.

Horns play according to MSCC 21-12-24/30S/1, 8, 14 trans B6. MSTT density 7, 10 trombones sustain a three part chord (from a chord table) until keyed off.

A user added effect to emphasize the change of scene just before measure seven. This particular type of harp gliss always starts on A6 or the closest note according to the PH (the present harmony) and persists for one beat which will always key 15 notes. This effect can be indicated when the user asks for a "musical effect" for a particular scene. The effect will be a harp gliss or a glockenspiel playing two ($8^{th}$) notes.

Referring more particularly to FIGS. 6 A-Q, Each time the COVS is given the exact same description, it will compose a musically different cue which will remain completely within the limits suggested by the description. Several cues for a particular scene may be saved and compared in order to select the final cue to be used. In the following description, the following definitions are used:

| | |
|---|---|
| CU | close up |
| MS | medium shot |
| MLS | medium long shot |
| LS | long shot |
| OOV | out of view |
| FI | fade in |
| FO | fade out |
| Pan | moving the camera while filming |

With reference too timing notations:

:00 MLS small canyon with creek, FI title, pan R to trail
very light scenic music—almost American Indian type.

:19 LS large red cliffs
medium scenic music

:28 fade to canyon view, LS high cliffs, majestic view
medium heavy scenic music :36 pan down cliff
slightly mysterious—light—scenic music depicting descending view 51 MLS man walking,
light neutral scenic music with a little movement 1:01 the camera pans up red cliffs—continue previous music 1:13 CU stream and the camera pulls back
quiet light, neutral scenic music—no movement 1:38 fade to view between rock walls (slightly dark)
slightly dark melodic music—no movement 1:53 fade to huge cliffs with waterfall
full, heavy melodic scenic music 2:17 CU small falls
light scenic "watery" sounding music 2:27 looking up at trail along red rock wall (hikers in view)
Light melodic—very light movement 2:39 view down
light scenic music descending feeling 2:48 LS scenic dome
full melodic scenic music 2:56 MS trail
very light music—lonesome feeling 3:04 CU quiet lizard
cute—very short cartoon effect 3:08 LS scenic canyon
heavy melodic scenic music—flowing motion 3:19 LS big stream and rock wall
continue above cue 3:32 pedestrian bridge across stream
light scenic music 3:42 LS horses and riders in stream, they pass OOV behind trees
scenic—light activity movement 4:03 start FO 4:05 black The scenic music cues used in "Zion" were selected from the following scenic music category descriptions. The musical composition is different each time the COVS composes a cue but the music remains in the chosen category. This means that the user can "save" several versions for comparison. Each of the following descriptions can be selected with movement or without movement. This would be useful if something in the scene is moving—an animal, someone walking, and the like.

Very Light Scenic
leaves, flowers, a small stream, a small canyon, a quiet place, nothing large
very light orchestration or just a few instruments
(specifying American Indian type resulted in just a flute and a harp)
movement Y/N Light Scenic
trees, rocks, cliffs, a small river, a small waterfall
melodic, light orchestration—not full sounding
movement Y/N Light Scenic
trees, rocks, cliffs, a small river, a small waterfall, under water
melodic, light orchestration—not full sounding
movement Y/N Medium Scenic
desert view, seascape, (not large waves), a river, forest
melodic music but not full sounding
movement Y/N Medium Heavy Scenic
majestic view, a seascape, mountain peak, canyon
full sounding orchestra
movement Y/N Heavy Scenic majestic view (Grand Canyon) huge mountain, crashing waves full orchestra, heavy melodic horns and brass movement Y/N Advantages, Techniques and Features The invention provides the following new features:

The four string banjo.

The five string (Bluegrass) banjo.

Jazz guitar, time sensitive (in ms) chord figures.

Moving harmonized chord notes; (d) Re-voicing left hand chords (and re-voicing on demand).

Creating a melody with a voice (or other) trigger.

Incorporating the player's theme into the accompaniment in real time or in advance of playing.

Hi-Lo chord system.

Accompaniment chord selection by melody note (includes Jazz Guitar chord melody figures).

New Techniques

Arrangements Specified by the Player: The player can elect the elements of the accompaniment designed by the original arranger. Rhythm if any. Orchestration—the instrumental sounds used on counter melodies, melody voice, on and on.

Computer generated Note Lists: Using intervals by semitones or scale steps within a specified range the computer processing unit can generate ascending or descending note lists.

Riffs, Repeated phrases and player created melodies: Select a particular number of notes (5, 6, 8, etc) from a style appropriate note list or the melody notes could be played by the player ahead of time to comprise a riff which is to be repeated, either by demand or automation, every so many measures. These same notes are transposed to fit the harmony present during the time period the riff is enabled.

After a selected note list has been transposed to fit the harmony of a particular phrase such as a melodic counter melody, these same notes from the note list can provide a similar melodic contour to a continuing counter melody after transposing them to fit the new harmony. Phrases which appear to be repeated lend great continuity to any arrangement. The notes comprising the original phrase, having been selected at random by the computer processing unit, will likely never be selected again. The notes for the particular note list could even be determined by the player.

Intros and Endings: Random selections, according to the style selected, for each intro sand ending are made from the following variables.

length 4, 6, 8 etc. measures harmonic sequence—which includes frequency of changes rhythmic density orchestration melodic contour This provides a tremendous variety of non-repeating intros and endings. These selections, according to the style selected, can also be made by the player allowing "customized" intros and endings.

Chord Correction: After the player has played a particular song, chord changes made or intended by the player are corrected, if necessary, mapped to an appropriate time on or preceding the beat intended and the appropriate data put into memory bank of favorite songs. The song can now be played back with the chord changes now occurring on the proper beats. The player can now play only the melody while listening to the accompaniment. This feature, coupled with the player's ability to "create" multiple arrangements as shown in item #1, below, make it possible to create hours of personal music.

Melody Activation: Given root and chord type information from any source, melodic figures sounding any musical voice or voices, can be triggered/gated by the electrical output from a breath controller or microphone the sounding of a musical pitch taken from a list of successive musical pitches related to a particular root and chord type and related to a particular style of music.

A second triggering/gating source can be a "key" comprising a switch registering, but not limited to, on and off times and velocity. A momentary contact device could also be used but has certain disadvantages.

The sounding of the musical pitch can be responsive to the varying level of the output from the triggering device as well as the length of time the output for each desired musical note exists in the same manner as depressing a key on a velocity sensitive musical keyboard.

The advantage of this system is that anyone with or without keyboard or vocal skills can now create melodic figures according to their personal preference. These figures can be solo instruments, accompanying counter melodies etc. sounded by any instrument or instruments all following the note list for the particular music style.

Since the "singer", whose actual voice is not heard, controls the timing of the sounding of each note, this system need not be driven by a clock from an automated musical instrument and can exist as an independent device.

Significant Features (1) Several notes (4 or 5 but not limited to) representing the main theme of the melody to be played, can be input by the player before starting the accompaniment or detected after the player begins to play the melody can be added to a note list and the spelling of those notes added to a melodic rhythmic template. This will make it possible for the accompaniment figures to reflect the main theme as is done in real life.

(2) Karaoke: A "keyboardless" stand alone device performing accompaniments in CO style reading chord changes only from a disc, card etc. for karaoke purposes. Lyrics by license and chord changes (no license required) for songs could be made available in great quantities.

(3) A remote control to activate accompaniment "fill ins" for a singer using the above device.

(4) Rhythm template ("RT") density: The rhythm templates necessary to identify a particular music style are usually one or two measures in length and the rhythmic density of these templates can vary from the very basic simple rhythm to quite complex rhythms. Each template should provide accompaniment which supports the particular style but should never interfere with the player's performing the melody. By monitoring the density of the melodic figures played by the player, accompanying rhythm templates with particular densities can be selected so as not to interfere with the player's melody.

(5) "Fill-ins" vs melody: Triggered "fill-ins" can cancel the player's melody momentarily allowing complex figures and harmony changes which would normally conflict with the melody. This would include harmonized string fills.

(6) Accompaniment for a specific song: Although this system is designed to provide musical accompaniment to non-specific songs, thereby avoiding interfering with the played melody, the "arranger" can indicate specific accompaniment phrases at particular times.

(7) Jazz guitar chord solo: Playing a single melody note with a JGT sound will produce properly voiced chords for the JGT. A melody note keyed within 150 ms, 200 ms of the off time of a previously keyed melody note will not be harmonized. The purpose here is to allow rapidly played melody notes to sound un-harmonized single notes as in real practice.

(8) Player selected arrangement: A variety accompaniment styles can be selected by the player. Examples:

Hi or Lo counter melodies.

Melody instrument and register.

Type of melody harmonization.

Accompaniment orchestration.

The same decisions made by the arranger except for RTs.

(9) Selecting brass chords by top note range: Brass or string chords can be selected according to the root and chord type plus the range of the top note relative to a small range window.

(10) Enabling anticipations: When playing a "swing" or "jazz" style, it is common practice for a player to anticipates harmony changes by keying the new harmony approximately one half beat ahead of the beat. An accompaniment note or chord played as an $8^{th}$ note on the second half on any beat is musically an anticipation of the next beat with respect to rhythm, melody and harmony.

All current accompaniment systems allow harmony changes only on the beat even if the player anticipates the harmony change as mentioned.

In 4/4 meter, most harmony changes take place on the strong beats 1 and 3 although harmony can also change on the weak beats 2 and 4. It is musically undesirable for an accompanying chord to begin to sound as an $8^{th}$ note on the second half of any beat unless it contains the harmony of the following beat.

This system allows harmony changes if they occur on the second half of any beat providing the player anticipates new harmony by the start of the second half of the beat.

The harmony change on the second half of the half beat will affect accompanying chords only. The bass serves as a rhythm instrument and does not generally anticipate harmony changes.

(11) Melody Activation: Given root and chord type information from any source, melodic figures sounding any musical voice or voices, can be triggered by the electrical output from a breath controller or microphone the sounding of a musical pitch taken from a list of successive musical pitches related to a particular root and chord type and related to a particular style of music.

A second triggering source can be a "key" comprising a switch registering, but not limited to, on and off times and velocity. A momentary contact device could also be used but has certain disadvantages.

The sounding of the musical pitch can be responsive to the varying level of the outputs as well as the length of time the output for each desired musical note exists in the same manner as depressing a key on a velocity sensitive musical keyboard.

The advantage of this system is that anyone with or without keyboard or vocal skills can now create melodic figures according to their personal preference. These figures can be solo instruments, accompanying counter melodies etc. sounded by any instrument or instruments all following the note list for the particular music style.

Since the "singer", whose actual voice is not heard, controls the timing of the sounding of each note, this system need not be driven by a clock from an automated musical instrument and can exist as an independent device.

(12) Keying a counter melody note by note by depressing keys below the sustained melody.

(13) Keying a self running counter melody with a pedal.

(14) Keying a running counter melody by reiterating the left hand chord.

(15) Changing sustained chord voicings by reiterating the left hand chord.

(16) Re-voicing LH chords.

Particular Proprietary Techniques

The following are particular proprietary techniques:

Melody tracking transposable melodic note list for providing moving harmonized figures within each chord for played or programmed melody note notes.

Transposable melodic contour specific and range specific melodic note lists for generating melodies and counter melodies. Ascending and descending note lists of any length can be employed serially to cover a great range. For ex: After the last note of an ascending list is used, the list is transposed to begin again on the next scale note above the last note used.

RGs new uses.

Parallel transposition technique for range restraint.

Hi-Lo chords.

System for random selection of chord voicings (strings brass etc).

System for incorporating a played or programmed melody into 5 string banjo automated "bluegrass" figures.

System for incorporating a played or programmed melody into "plectrum" banjo automated figures.

Voice, or other triggering device, activated melody including harmonization.

System for the harmonic analysis of each melodic note generated.

Range sensitive voicing for all instruments. (top note chord selection for range).

Selection of accompaniment chords by the root. (and range).

Density of player notes determining the density of the MRTs selected.

Gating the selection of melodic notes (voice gating etc) and the use of (rgs).

JGT chord figures responsive to the tempo.

A system for allowing the player to determine a large portion of the accompaniment style by selecting options before starting to play. there may be several patents here: select orchestration, density, accompaniment range.

In real time, incorporating any desired thematic figures being played by the player into the accompaniment as counter melody figures. This could include the first few identifying notes of a particular song as the player starts playing although these same notes could be input before starting to play. Several notes comprising a rift can be repeated automatically or on demand and parallel transposed to fit the current harmony at any point while maintaining the exact same range no matter the shift in roots.

Re-voicing the chord indicated by the players left hand to suit the type of instrument(s) sounding. This includes changing the chord voicing (probably sustained chords) by reiterating the left hand chord or any other triggering device.

Making the timing of the automatic accompaniment figures responsive to the tempo in order to achieve the proper "swing" feel at any tempo.

Allowing left hand harmony ID anticipations in order for the accompaniment to achieve a "swing" feel.

Recording the elements involved in generating the accompaniment for a particular phrase of any length so the same accompaniment can be repeated.

Triggered "fill-ins", since they are generated and are not ever repeated, can extend for any length of time if under the player's control. A "fill in" can cancel a melody note (which, in certain instances is being sustained by the player for several beats) in order to avoid tonal clashes.

The COS can generate a single melody or many melodies simultaneously in real time.

The COS can generate a single counter melody or many counter melodies simultaneously in real time.

The COS can generate accompaniment in real time. Each note is generated, and harmonized if desired, and orchestrated at the moment it is to sound.

The COS can generate full orchestral accompaniment, using all the instrumental sections (stings, brass, woodwinds and percussion, etc.), in the style of a professional orchestrator.

The COS generates musically correct orchestration and voicing by evaluating each note generated with respect to its harmonic function.

The COS always generates non repetitive accompaniment unless repetition is required by a particular style.

The COVS can compose, orchestrate and perform a custom musical score which can be synchronized to your video. The score can be "performed" by a small group or an orchestra of any size, including a symphony orchestra. The video with the accompanying music score can then be recorded on a DVD.

The only information the COVS needs to have to compose a film score is specified in the two categories below:

Picture timings of selected scenes.

Selection of the type of music to accompany the film

The type of music for each scene can be selected from a comprehensive list of various types of music such as travel, light activity, documentary, comedy, cartoon, scenic, various rock styles, action, mystery, light dramatic, heavy dramatic, romantic, jazz, Latin, ethnic, etc.

The invention claimed is:

1. A method for using a computer processing unit to compose a melody, comprising:

(a) selecting a composition style and selecting a melody note from a note sequence conforming to said composition style;

(b) determining the harmony in existence at the time said melody note is selected;

(c) comparing the selected melody note to said harmony;

(d) determining whether any transposition is required to conform the selected melody note to said harmony;

(e) performing a harmony conforming transposition on the selected note if required by step (d); and (f) using either the melody note of step (d) or step (e) as the next note in the composition in accordance with timing compatible with said composition style.

2. The method of claim 1 including the further steps, prior to step (f) of claim 1, of:

(i) determining if the duration of the selected note or harmony conformed transposed note is compatible with said harmony; and (ii) if step (i) is negative, then performing a duration transposition of the note in accordance with said list of note duration parameters.

3. The method of claim 2 in which the compatibility determination made in step (i) of claim 2 and the duration transposition of step (ii) of claim 2 are made in accordance with a list of note duration parameters.

4. The method of claim 1 in which the composition style is selected by a player inputting to said computer processing unit one or more notes using a music generating instrument connected to said computer processing unit.

5. The method of claim 1 in which the composition style is selected by inputting to said computer processing unit an instrument relating to said composition style.

6. The method of claim 5 in which said input to said computer processing unit is in the form of text instruction.

7. The method of claim 5 in which said input to said computer processing unit is in the form of an external signal.

8. The method of claim 5 in which said input to said computer processing unit is a pre-recorded composition.

9. The method of claim 1 in which the note sequence has at least on of the following parameters:

the number of notes before repeating, the musical interval encompassed by the sequence, the starting pitch of the highest note that defines the octaves (the musical register) in which the melody notes will sound, and approved duration parameters.

10. The method of claim 1 in which the timing compatibility of the composition style is determined by at least on of the following parameters:

the exact points in time relative to the musical beat when the melody notes from the MSCC will be keyed, the duration of the melody note, and the velocity (volume) with which the note will sound.

11. An apparatus using a computer processing unit to compose a melody, comprising:

(a) means for selecting a composition style and selecting a melody note from a note sequence conforming to said composition style;

(b) means for determining the harmony in existence at the time said melody note is selected;

(c) means for comparing the selected melody note to said harmony;

(d) means for determining whether any transposition is required to conform the selected melody note to said harmony;

(e) means for performing a harmony conforming transposition on the selected note if required by step (d); and (f) means for using either the melody note of step (d) or step (e) as the next note in the composition in accordance with timing compatible with said composition style.

12. The apparatus of claim 11 including the further steps, prior to step (f) of claim 1, of:

(i) determining if the duration of the selected note or harmony conformed transposed note is compatible with said harmony; and (ii) if step (i) is negative, then performing a duration transposition of the note in accordance with said list of note duration parameters.

13. The apparatus of claim 12 in which the compatibility determination made in step (i) of claim 2 and the duration transposition of step (ii) of claim 2 are made in accordance with a list of note duration parameters.

14. The apparatus of claim 11 in which the composition style is selected by a player inputting to said computer processing unit one or more notes using a music generating instrument connected to said computer processing unit.

15. The apparatus of claim 11 in which the composition style is selected by inputting to said computer processing unit an instrument relating to said composition style.

16. The apparatus of claim 15 in which said input to said computer processing unit is in the form of text instruction.

17. The apparatus of claim 15 in which said input to said computer processing unit is in the form of an external signal.

18. The apparatus of claim 15 in which said input to said computer processing unit is a pre-recorded composition.

19. The apparatus of claim 11 in which the note sequence has at least on of the following parameters:

the number of notes before repeating, the musical interval encompassed by the sequence, the starting pitch of the highest note that defines the octaves (the musical register) in which the melody notes will sound, and approved duration parameters.

20. The apparatus of claim 11 in which the timing compatibility of the composition style is determined by at least on of the following parameters:

the exact points in time relative to the musical beat when the melody notes from the MSCC will be keyed, the duration of the melody note, and the velocity (volume) with which the note will sound.

* * * * *